US010795958B2

(12) United States Patent
Jones et al.

(10) Patent No.: US 10,795,958 B2
(45) Date of Patent: Oct. 6, 2020

(54) INTELLIGENT DISTRIBUTED GEOGRAPHIC INFORMATION SYSTEM

(71) Applicant: GOOGLE LLC, Mountain View, CA (US)

(72) Inventors: Michael T. Jones, Los Altos Hills, CA (US); John Rohlf, Campbell, CA (US); Brian McClendon, Portola Valley, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/659,811

(22) Filed: Oct. 22, 2019

(65) Prior Publication Data

US 2020/0050647 A1    Feb. 13, 2020

Related U.S. Application Data

(63) Continuation of application No. 15/295,935, filed on Oct. 17, 2016, now Pat. No. 10,496,724, which is a
(Continued)

(51) Int. Cl.
*G06F 16/9537* (2019.01)
*G06F 16/29* (2019.01)
(Continued)

(52) U.S. Cl.
CPC ...... *G06F 16/9537* (2019.01); *G06F 3/04815* (2013.01); *G06F 16/248* (2019.01);
(Continued)

(58) Field of Classification Search
CPC ......... G06F 17/30864; G06F 17/30867; G06F 17/30991; G06F 17/30696;
(Continued)

(56) References Cited

U.S. PATENT DOCUMENTS

| 5,341,463 A | 8/1994 | Wescott et al. |
| 5,490,285 A | 2/1996 | Ahlenius et al. |

(Continued)

FOREIGN PATENT DOCUMENTS

| EP | 1 193 626 A1 | 4/2002 |
| GB | 2 356 948 A | 6/2001 |

(Continued)

OTHER PUBLICATIONS

"Aspen Movie Map," Wikipedia, Feb. 21, 2010, 4 pages, [online] [retrieved on Jul. 29, 2010] Retrieved onlineURL:http://en.wikipedia.org/wiki/Aspen.sub.--Movie.sub.--Map.

(Continued)

*Primary Examiner* — Abderrahim Merouan
(74) *Attorney, Agent, or Firm* — Marshall Gerstein & Borun LLP

(57) ABSTRACT

Interactive geographic information systems (GIS) and techniques are disclosed that provide users with a greater degree of flexibility, utility, and information. A markup language is provided that facilitates communication between servers and clients of the interactive GIS, which enables a number of GIS features, such as network links (time-based and/or view-dependent dynamic data layers), ground overlays, screen overlays, placemarks, 3D models, and stylized GIS elements, such as geometry, icons, description balloons, polygons, and labels in the viewer by which the user sees the target area. Also, "virtual tours" of user-defined paths in the context of distributed geospatial visualization is enabled. Streaming and interactive visualization of filled polygon data are also enabled thereby allowing buildings and other such features to be provided in 3D. Also, techniques for enabling ambiguous search requests in a GIS are provided.

17 Claims, 13 Drawing Sheets

Related U.S. Application Data continuation of application No. 13/736,808, filed on Jan. 8, 2013, now Pat. No. 9,471,625, which is a continuation of application No. 13/471,319, filed on May 14, 2012, now Pat. No. 8,350,849, which is a continuation of application No. 11/426,694, filed on Jun. 27, 2006, now abandoned.

(60) Provisional application No. 60/694,529, filed on Jun. 27, 2005.

(51) Int. Cl.

| | | |
|---|---|---|
| *G06F 16/248* | (2019.01) | |
| *G06F 16/242* | (2019.01) | |
| *G06F 3/0481* | (2013.01) | |
| *G06T 17/05* | (2011.01) | |
| *G06N 7/00* | (2006.01) | |
| *G06Q 40/00* | (2012.01) | |
| *G06F 16/28* | (2019.01) | |
| *G06F 16/338* | (2019.01) | |
| *G06F 16/951* | (2019.01) | |
| *G06F 16/9038* | (2019.01) | |
| *G06F 16/9535* | (2019.01) | |

(52) U.S. Cl.
CPC ...... *G06F 16/2425* (2019.01); *G06F 16/2428* (2019.01); *G06F 16/29* (2019.01); *G06N 7/005* (2013.01); *G06T 17/05* (2013.01); *G06F 16/284* (2019.01); *G06F 16/338* (2019.01); *G06F 16/9038* (2019.01); *G06F 16/951* (2019.01); *G06F 16/9535* (2019.01); *G06Q 40/00* (2013.01)

(58) Field of Classification Search
CPC ........ G06F 17/30398; G06F 17/30595; G06Q 30/02; G06Q 40/00
See application file for complete search history.

(56) References Cited

U.S. PATENT DOCUMENTS

| | | | |
|---|---|---|---|
| 5,579,459 | A | 11/1996 | Jennyc |
| 5,613,051 | A | 3/1997 | Lodice et al. |
| 5,754,182 | A | 5/1998 | Kobayashi |
| 5,760,783 | A | 6/1998 | Migdal et al. |
| 5,901,214 | A | 5/1999 | Shaffer et al. |
| 5,929,860 | A | 7/1999 | Hoppe |
| 6,014,614 | A | 1/2000 | Herring et al. |
| 6,054,990 | A | 4/2000 | Tran |
| 6,100,897 | A | 8/2000 | Mayer et al. |
| 6,111,583 | A | 8/2000 | Yaron et al. |
| 6,144,338 | A | 11/2000 | Davies |
| 6,202,026 | B1 | 3/2001 | Nimura et al. |
| 6,215,503 | B1 | 4/2001 | Snyder et al. |
| 6,222,557 | B1 | 4/2001 | Pulley, IV et al. |
| 6,229,546 | B1 | 5/2001 | Lancaster et al. |
| 6,236,907 | B1 | 5/2001 | Hauwiller et al. |
| 6,247,019 | B1 | 6/2001 | Davies |
| 6,262,741 | B1 | 7/2001 | Davies |
| 6,307,573 | B1 | 10/2001 | Barros |
| 6,321,158 | B1 | 11/2001 | DeLorme et al. |
| 6,346,938 | B1 | 2/2002 | Chan et al. |
| 6,388,684 | B1 | 5/2002 | Iwamura et al. |
| 6,392,646 | B1 | 5/2002 | Yamrom et al. |
| 6,452,596 | B1 | 9/2002 | Gueziec et al. |
| 6,473,691 | B1 | 10/2002 | Winter et al. |
| 6,489,955 | B1 | 12/2002 | Newhall, Jr. |
| 6,496,189 | B1 | 12/2002 | Yaron et al. |
| 6,525,726 | B1 | 2/2003 | Xie et al. |
| 6,553,420 | B1 | 4/2003 | Karger et al. |
| 6,594,823 | B1 | 7/2003 | Corbin et al. |
| 6,604,046 | B1 | 8/2003 | Van Watermulen et al. |
| 6,622,090 | B2 | 9/2003 | Lin |
| 6,665,840 | B1 | 12/2003 | Wiley et al. |
| 6,687,832 | B1* | 2/2004 | Harada ................ H04L 41/12 726/22 |
| 6,697,799 | B1 | 2/2004 | Neal et al. |
| 6,721,769 | B1 | 4/2004 | Rappaport et al. |
| 6,724,382 | B2 | 4/2004 | Kenyon et al. |
| 6,772,142 | B1 | 8/2004 | Kelling et al. |
| 6,772,174 | B1 | 8/2004 | Pettersson |
| 6,836,270 | B2 | 12/2004 | Du |
| 6,856,807 | B1 | 2/2005 | Raith |
| 6,858,826 | B2 | 2/2005 | Mueller et al. |
| 6,901,428 | B1 | 5/2005 | Frazier et al. |
| 6,937,936 | B2 | 8/2005 | Nimura |
| 6,999,079 | B2 | 2/2006 | Kida |
| 6,999,876 | B2 | 2/2006 | Lambert et al. |
| 7,031,838 | B1 | 4/2006 | Young et al. |
| 7,096,428 | B2 | 8/2006 | Foote et al. |
| 7,158,878 | B2 | 1/2007 | Rasmussen et al. |
| 7,177,761 | B2 | 2/2007 | Kaufman et al. |
| 7,225,207 | B1 | 5/2007 | Ohazama et al. |
| 7,256,732 | B2 | 8/2007 | De Salas et al. |
| 7,353,114 | B1 | 4/2008 | Rohlf et al. |
| 7,376,510 | B1 | 5/2008 | Green |
| 7,460,953 | B2 | 12/2008 | Herbst et al. |
| 7,475,060 | B2 | 1/2009 | Toyama et al. |
| 7,483,881 | B2 | 1/2009 | Egnor et al. |
| 7,716,162 | B2 | 5/2010 | Egnor |
| 7,746,343 | B1 | 6/2010 | Charaniya et al. |
| 7,933,395 | B1 | 4/2011 | Bailly et al. |
| 7,933,929 | B1 | 4/2011 | McClendon et al. |
| 8,350,849 | B1 | 1/2013 | Jones et al. |
| 9,460,175 | B1 | 10/2016 | Hong |
| 9,471,625 | B2 | 10/2016 | Jones et al. |
| 10,489,965 | B1* | 11/2019 | Cregan ................ G06T 15/20 |
| 2001/0030667 | A1 | 10/2001 | Kelts |
| 2001/0032165 | A1 | 10/2001 | Friend et al. |
| 2001/0040505 | A1 | 11/2001 | Ishida et al. |
| 2002/0032612 | A1 | 3/2002 | Williams et al. |
| 2002/0035451 | A1 | 3/2002 | Rothermel |
| 2002/0049742 | A1 | 4/2002 | Chan et al. |
| 2002/0055926 | A1 | 5/2002 | Dan et al. |
| 2002/0067353 | A1 | 6/2002 | Kenyon et al. |
| 2002/0067379 | A1* | 6/2002 | Kenyon ................ G06F 16/29 715/838 |
| 2002/0070981 | A1 | 6/2002 | Kida |
| 2002/0103597 | A1 | 8/2002 | Takayama et al. |
| 2002/0112237 | A1 | 8/2002 | Kelts |
| 2002/0113797 | A1 | 8/2002 | Potter et al. |
| 2002/0123841 | A1 | 9/2002 | Satoh et al. |
| 2002/0129014 | A1 | 9/2002 | Kim et al. |
| 2002/0156779 | A1 | 10/2002 | Elliott et al. |
| 2002/0174066 | A1 | 11/2002 | Kleckner et al. |
| 2002/0188402 | A1 | 12/2002 | Huang et al. |
| 2003/0020746 | A1* | 1/2003 | Chen ................ G06F 16/972 715/741 |
| 2003/0061211 | A1 | 3/2003 | Shultz et al. |
| 2003/0069693 | A1 | 4/2003 | Snapp et al. |
| 2003/0074391 | A1 | 4/2003 | Carter et al. |
| 2003/0220735 | A1 | 11/2003 | Nimura |
| 2004/0041805 | A1 | 3/2004 | Hayano et al. |
| 2004/0070678 | A1 | 4/2004 | Toyama et al. |
| 2004/0078750 | A1 | 4/2004 | Frank |
| 2004/0093325 | A1 | 5/2004 | Banerjee et al. |
| 2004/0105573 | A1 | 6/2004 | Neumann et al. |
| 2004/0217980 | A1 | 11/2004 | Radburn et al. |
| 2004/0219980 | A1* | 11/2004 | Bassett ................ A63F 13/10 463/33 |
| 2004/0225635 | A1 | 11/2004 | Toyama et al. |
| 2005/0027705 | A1 | 2/2005 | Sadri et al. |
| 2005/0050112 | A1 | 3/2005 | Chandrasekaran |
| 2005/0050472 | A1 | 3/2005 | Faseler et al. |
| 2005/0065959 | A1 | 3/2005 | Smith et al. |
| 2005/0080786 | A1 | 4/2005 | Fish et al. |
| 2005/0091193 | A1 | 4/2005 | Frank et al. |
| 2005/0096849 | A1 | 5/2005 | Sorrells |
| 2005/0110789 | A1 | 5/2005 | Le Ouay |
| 2005/0197894 | A1 | 9/2005 | Fairbanks et al. |
| 2005/0216300 | A1 | 9/2005 | Appelman et al. |

(56) References Cited

U.S. PATENT DOCUMENTS

| | | | |
|---|---|---|---|
| 2005/0246373 A1* | 11/2005 | Faulkner | G06F 16/78 |
| 2005/0257241 A1 | 11/2005 | Faulkner et al. | |
| 2005/0273469 A1 | 12/2005 | Monberg et al. | |
| 2005/0278309 A1 | 12/2005 | Evans et al. | |
| 2005/0278378 A1* | 12/2005 | Frank | G06F 16/38 |
| 2006/0002590 A1 | 1/2006 | Borak | |
| 2006/0004512 A1 | 1/2006 | Herbst et al. | |
| 2006/0074980 A1 | 4/2006 | Sarkar | |
| 2006/0075442 A1 | 4/2006 | Meadow | |
| 2006/0085392 A1 | 4/2006 | Wang et al. | |
| 2006/0149734 A1 | 7/2006 | Egnor et al. | |
| 2006/0149742 A1 | 7/2006 | Egnor | |
| 2006/0170693 A1 | 8/2006 | Bethune et al. | |
| 2006/0249566 A1 | 11/2006 | Alleshouse | |
| 2006/0253458 A1 | 11/2006 | Dixon et al. | |
| 2006/0271277 A1 | 11/2006 | Hu et al. | |
| 2006/0271280 A1* | 11/2006 | O'Clair | G06F 16/9537 701/455 |
| 2006/0271281 A1 | 11/2006 | Ahn et al. | |
| 2006/0288014 A1 | 12/2006 | Edwards et al. | |
| 2007/0100802 A1 | 5/2007 | Celik | |
| 2007/0250468 A1 | 10/2007 | Pieper | |
| 2008/0010262 A1 | 1/2008 | Frank | |
| 2008/0016472 A1 | 1/2008 | Rohlf et al. | |
| 2009/0037103 A1 | 2/2009 | Herbst et al. | |
| 2012/0254804 A1 | 10/2012 | Sheha et al. | |
| 2012/0323360 A1 | 12/2012 | Lavin | |
| 2013/0282723 A1 | 10/2013 | Petersen et al. | |
| 2013/0326425 A1 | 12/2013 | Forstall et al. | |
| 2014/0095303 A1 | 4/2014 | Jones et al. | |

FOREIGN PATENT DOCUMENTS

| | | | |
|---|---|---|---|
| WO | WO-2000/041090 A1 | 7/2000 | |
| WO | WO-2002/065331 A2 | 8/2002 | |

OTHER PUBLICATIONS

"Aspen Movie Map," Wikipedia, Feb. 21, 2010, 4 pages, [online] [retrieved on Jul. 29, 2010] Retrieved online <URL:http://en.wikipedia.org/wiki/Aspen_Movie_Map>.

"ESRI Video Clips, What is GIS?", [online] [Retrieved on Oct. 9, 2006]. Retrieved from the Internet<URL:http://gis.esri. comlesriclips/clip.cfm?ClipID=60>.

"ESRI Video Clips, What is GIS?", [online] [Retrieved on Oct. 9, 2006]. Retrieved from the Internet<URL:http://gis.esri..sub.--comlesriclips/clip.cfm?ClipID=60&g- t;.

"ESRI Video Clips, What is GIS?", [online] [Retrieved on Oct. 9, 2006]. Retrieved from the InternetURL:http://gis.esri..sub.--comlesriclips/clip.cfm?ClipID=60.

Geo-Web, Markup and Geo-Web, GML and KML Syntax, [online], [retrieved on Oct. 23, 2007], Retrieved from the Internet <URL: http://geoweb.blog.com/313918/>, p. 1-10.

"Geography Markup Language" Wikipedia, [online], [retrieved on Oct. 23, 2007], Retrieved from the Internet <URL: http://en.wikipedia.org/wiki/Geography_Markup_Language>, p. 1-8.

"Geography Markup Language" Wikipedia, [online], [retrieved on Oct. 23, 2007], Retrieved from the Internet <URL: http://en.wikipedia.org/wiki/Geography.sub.--Markup.sub.--Language> p. 1-8.

"Introduction to ArcXML," ESRI Developer Network, 2005, 7 pages, [online] [retrieved on Aug. 9, 2006] Retrieved from the Internet: <URL:http://edndoc.esri.com/arcims/9.0/elements/coverpage.htm>.

"Styled Layer Descriptor Application Profile of the Web Map Service: Draft Implementation Specification," Open Geospatial Consortium, Inc., Oct. 19, 2005, pp. i-ix, 1-44, Reference No. OGC 05-078, Version 1.1.0, Dr. Markus Muller, James MacGill,eds.

"Styled Layer Descriptor Implementation Specification," Open GIS Consortium Inc., Sep. 19, 2002, pp. i-ix, 1-107, Reference No. OGC 02-070, Version 1.0.0, William Lalonde, ed.

"Styled Layer Descriptor, OpenGIS.RTM. Styled Layer Descriptor (SLD) Implementation Specification," Open Geospatial Consortium, Inc., 2006, 2 pages, [online] [retrieved on Aug. 9, 2006] Retrieved from the Internet: <URL:http://www.opengeospatial.org/standards/sid>.

"Styled Layer Descriptor, OpenGIS® Styled Layer Descriptor (SLD) Implementation Specification," Open Geospatial Consortium, Inc., 2006, 2 pages, [online] [retrieved on Aug. 9, 2006] Retrieved from the Internet: <URL: http://www.opengeospatial.org/standards/sld>.

Azuma, R., "A Survey of Augmented Reality," in Presence: Teleoperators and Virtual Environments, pp. 355-385, Aug. 1997, vol. 6, No. 4.

Chen, S., "QuickTime.RTM. VR—An Image-Based Approach to Virtual Environment Navigation," Proceedings of the 22.sub.nd Annual Conference on Computer, ACM, 1995, pp. 29-38.

Chen, S., "QuickTime.RTM. VR—An Image-Based Approach to Virtual Environment Navigation," Proceedings of the 22nd Annual Conference on Computer, ACM, 1995, pp. 29-38.

Chen, S., "QuickTime® VR—An Image-Based Approach to Virtual Environment Navigation," Proceedings of the 22nd Annual Conference on Computer, ACM, 1995, pp. 29-38.

Cosman, M., "Global Terrain Texture: Lowering the Cost," Proceedings of the 1994 Image VII Conference, Tempe, Arizona: The Image Society, pp. 53-64.

Endo, T., et al., "Image-Based Walk-Through System for Large-Scale Scenes," Proc. Virtual Systems and Multimedia, 1998, 6 Pages.

Feiner, S., et al., "Knowledge-Based Augmented Reality," Communications of the ACM, Jul. 1993, pp. 53-62, vol. 36, No. 7.

Fraser, B., et al., "Usability of Geospatial Metadata for Space-Time Matters," Bulletin of American Society for Information Science and Technology, Aug. 1999, pp. 24-28, vol. 25, No. 6.

Fraser, B., et al., "Usability of Geospatial Metadata for Space-Time Matters," Bulletin of American Socity for Information Science and Technology, Aug. 1999, pp. 24-28, vol. 25, No. 6.

Gleicher, M. et al., "Through-the-Lens Camera Control," Computer Graphics, Proceedings SIGGRAPH '92, Jul. 1992, pp. 331-340, vol. 26, No. 2, [online]. [Retrieved on Oct. 9, 2006] Retrieved from the Internet <URL:http://www.cs.wisc.edu/graphics/Papers/Gleicher/CMU/camera.pdf&g- t;.

Gleicher, M. et al., "Through-the-Lens Camera Control," Computer Graphics, Proceedings SIGGRAPH '92, Jul. 1992, pp. 331-340, vol. 26, No. 2, [online]. [Retrieved on Oct. 9, 2006] Retrieved from the Internet <URL: http://www.cs.wisc.edu/graphics/Papers/Gleicher/CMU/camera.pdf>.

Gravano, L., et al., "Categorizing Web Queries According to Geographical Locality," Conference on Information and Knowledge Management, Nov. 3-8, 2008, p. 325-333.

Hirose, M., "Image-Based Virtual World Generation," IEEE MultiMedia, Jan.-Mar. 1997, pp. 27-33.

Hollerer, T., et al., "Mobile Augmented Reality," Chapter 9, Telegeoinformatics: Location-Based Computing and Services, Jan. 2004, pp. 221-260, H Karimi and A. Hammad (eds.). Taylor & Francis Books Ltd.

Kato, K., et al., "Town digitizing: Recording of street views by using omnidirectional visions sensors," IEEE Industrial Electronics Society, 2000, pp. 2571-2576.

Kimber, D., et al., "FlyAbout: Spatially Indexed Panoramic Video," International Multimedia Conference, 2001, 10 Pages.

Leclerc, Y. and Lau, S., "TerraVision: A Terrain Visualization System," SRI International, Menlo Park, California, Tech. Note No. 540, Apr. 22, 1994, pp. 1-20.

Lippman, A., "Movie-Maps: An Application of the Optical Videodisc to Computer Graphics," Proceedings of the 7th annual conference on Computer, ACM, 1980, pp. 32-42.

Meeks, W., et al., "Geospatial information utility: an estimation of the relevance of geospatial information to users," Decision Support Systems, 2003, pp. 1-17.

Mohl, R., "Cognitive space in the interactive movie map : an investigation of spatial learning in virtual environments," Thesis (Ph.D.)—Massachusetts Institute of Technology, Dept. of Architecture, 1982, 233 Pages.

Naimark, M., "A 3D Moviemap and a 3D Panorama," SPIE Proceedings, 1997, 11 Pages, vol. 3012.

(56) References Cited

OTHER PUBLICATIONS

Rabinovich, B., et al., Visualization of Large Terrains in Resource-Limited Computing Environments, Proceedings of the 8th IEEE Visualization '97 Conference, Oct. 19-24, 1997, pp. 95-102, Phoenix, Arizona.

Reitmayr, G., et al., "Collaborative Augmented Reality for Outdoor Navigation and Information Browsing," Proceedings of the Second Symposium on Location Based Services and TeleCartography, pp. 31-41, 2004.

Rekimoto, J., et al., "The World through the Computer: Computer Augmented Interaction with Real World Environments," Symposium on User Interface Software and Technology, Proceedings of the 8th annual ACM symposium on User interface and software technology, 1995, pp. 29-36.

Ribeiro, J.A., et al., "A Syntactic and Lexicon Analyzer for the Geography Markup Language (GML)," IEEE, 2004, p. 2896-2899.

Starner, T., et al., "Augmented Reality Through Wearable Computing," M.I.T. Media Laboratory Perceptual Computing Section Technical Report No. 397, 1997, pp. 1-9.

Summons to attend oral proceedings pursuant to Rule 115(1) EPC, for European Patent Application No. EP 06826074.4, Oct. 27, 2010, 6 pages.

Taylor, C., "VideoPlus: A Method for Capturing the Structure and Appearance of Immersive Environments," IEEE Transactions on Visualization and Computer Graphics, Apr.-Jun. 2002, pp. 171-182, vol. 8, Is. 2.

U.S. Appl. No. 10/270,272 (now U.S. Pat. No. 7,225,207), "Server for Geospatially Organized Flat File Data," filed Oct. 10, 2002.

U.S. Appl. No. 11/024,785 (now U.S. Pat. No. 7,716,162), "Classification of Ambiguous Geographic References," filed Dec. 30, 2004.

U.S. Appl. No. 11/024,977 (now U.S. Pat. No. 7,483,881), "Determining Unambiguous Geographic References," filed Dec. 30, 2004.

U.S. Appl. No. 11/426,681 (now U.S. Pat. No. 7,933,395), "Virtual Tour of User-Defined Paths in a Geogrphic Information System," filed Jun. 27, 2006.

U.S. Appl. No. 11/426,686 (now U.S. Pat. No. 7,746,343), "Streaming and Interactive Visualization of Filled Polygon Data in a Geographic Information System," filed Jun. 27, 2006.

U.S. Appl. No. 11/426,694 (now Abandoned), "Dynamic View-Based Data Layer in a Geographic Information System," filed Jun. 27, 2006.

U.S. Appl. No. 11/426,760 (Pending), filed Jun. 27, 2006.

U.S. Appl. No. 11/426,783 (now U.S. Pat. No. 7,933,929), "Network Link for Providing Dynamic Data Layer in a Geographic Information System," filed Jun. 27, 2006.

U.S. Appl. No. 11/426,831 (now U.S. Pat. No. 7,353,114), "Markup Language for an Interactive Geographic Information System," filed Jun. 27, 2006.

U.S. Appl. No. 12/060,016 (now Abandoned), filed Mar. 31, 2008.

Uyttendaele, M., et al., "Image-Based Interactive Exploration of Real-World Environments," IEEE Computer Graphics and Applications, May/Jun. 2004, pp. 52-62.

Wang, L., et al., "Detecting Dominant Locations from Search Queries," Proceedings of the 28th annual international ACM SIGIR conference on Research and development in information retrieval, Aug. 15-19, 2005, p. 424-431.

Office Action for U.S. Appl. No. 15/295,935, dated Mar. 8, 2018.
Office Action for U.S. Appl. No. 15/295,935, dated Jul. 13, 2018.
Office Action for U.S. Appl. No. 15/295,935, dated Oct. 18, 2018.
Office Action for U.S. Appl. No. 15/295,935, dated May 13, 2019.

* cited by examiner

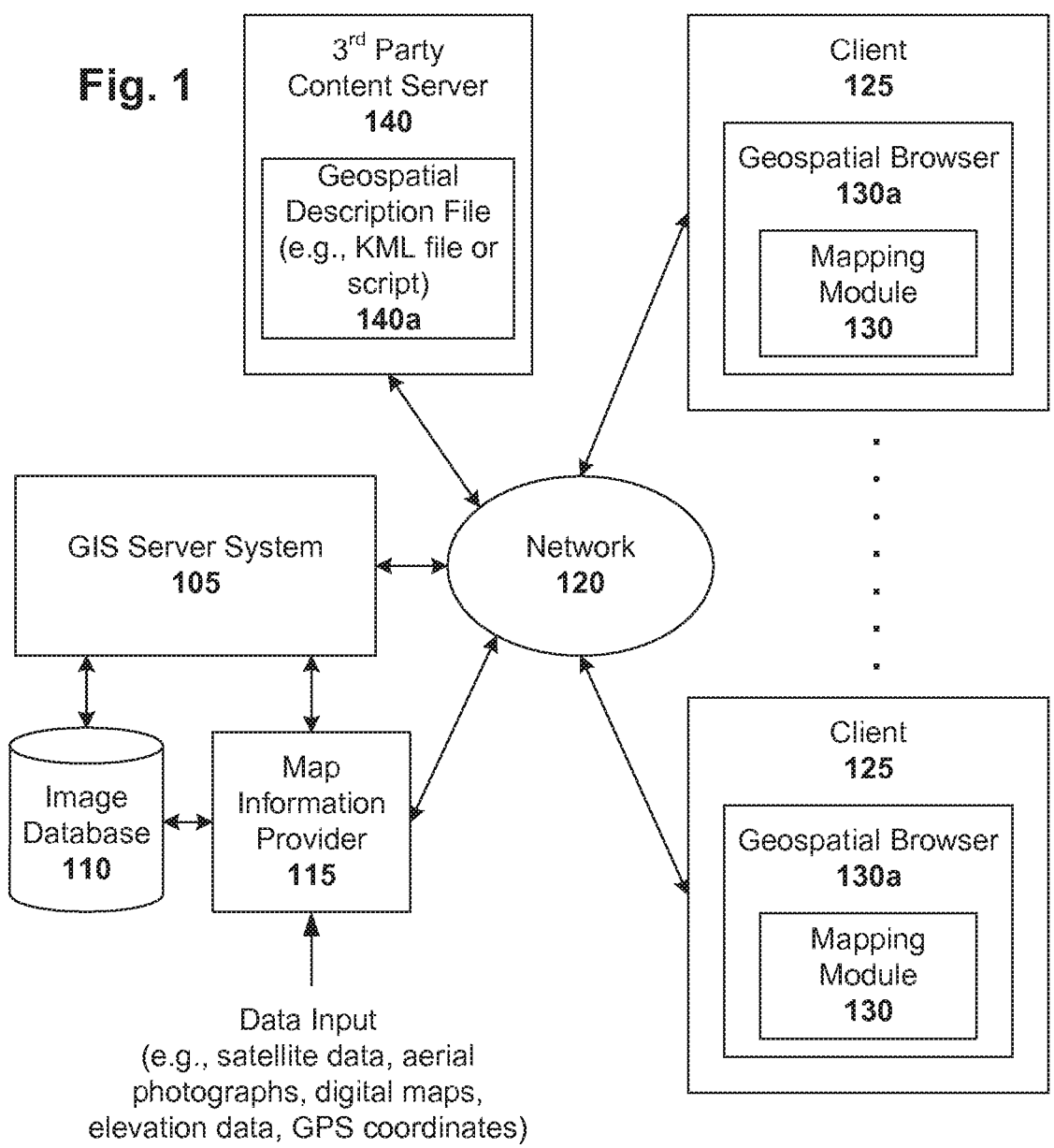

INTELLIGENT DISTRIBUTED GEOGRAPHIC INFORMATION SYSTEM

RELATED APPLICATIONS

This application is a continuation of U.S. patent application Ser. No. 15/295,935, filed Oct. 17, 2016, titled "Intelligent Distributed Geographic Information System" which is a continuation of U.S. patent application Ser. No. 13/736,808, filed Jan. 8, 2013, titled "Dynamic View-Based Data Layer in a Geographic Information System" (now U.S. Pat. No. 9,471,625), which is a continuation of U.S. patent application Ser. No. 13/471,319, filed May 14, 2012, titled "Dynamic View-Based Data Layer in a Geographic Information System" (now U.S. Pat. No. 8,350,849), which is a continuation of U.S. patent application Ser. No. 11/426,694, filed Jun. 27, 2006, titled "Dynamic View-Based Data Layer In A Geographic Information System", which claims the benefit of U.S. Provisional Application No. 60/694,529, filed Jun. 27, 2005, titled "Intelligent Distributed Geographic Information System." In addition, this application is related to U.S. application Ser. No. 11/426,681, filed Jun. 27, 2006, titled "Virtual Tour of User-Defined Paths in a Geographic Information System". In addition, this application is related to U.S. application Ser. No. 11/426,686, filed Jun. 27, 2006, titled "Streaming and Interactive Visualization of Filled Polygon Data in a Geographic Information System". In addition, this application is related to U.S. application Ser. No. 11/426,783, filed Jun. 27, 2006, titled "Network Link For Providing Dynamic Data Layer in a Geographic Information System". In addition, this application is related to U.S. application Ser. No. 11/426,831, filed Jun. 27, 2006, titled "Markup Language for an Interactive Geographic Information System". In addition, this application is related to U.S. application Ser. No. 11/426,760, filed Jun. 27, 2006, titled "Processing Ambiguous Search Requests in a Geographic Information System". In addition, this application is related to U.S. application Ser. No. 10/270,272, filed Oct. 10, 2002, titled "Server for Geospatially Organized Flat File Data." Each of these applications is herein incorporated in its entirety by reference.

FIELD OF THE INVENTION

The invention relates to mapping systems, and more particularly, to geographic information systems and distributed geographic information systems.

BACKGROUND OF THE INVENTION

A geographic information system (GIS) is a system for archiving, retrieving, and manipulating data that has been stored and indexed according to the geographic coordinates of its elements. The system generally can utilize a variety of data types, such as imagery, maps, and tables. One company involved in geographic information systems is ESRI, which maintains a website at www.gis.com that includes background information on conventional geographic information systems.

Generally, conventional geographic information systems have limited usefulness in both their overall functionality and user interface. For example, any information search capabilities present in conventional GIS and distributed geographic information systems (DGIS) have historically required a user to disambiguate the nature of a search request, selecting search scopes like "address search" or "lot number search" as either an explicit component of the search process or implicitly by allowing only a single scope (most often "address") within which all search requests are interpreted. In this sense, conventional GIS are effectively hardwired to search and use particular kinds of information.

What is needed, therefore, are geographic information systems that provide users with a greater degree of flexibility, utility, and information.

SUMMARY OF THE INVENTION

One embodiment of the present invention provides a method for providing layered information in a geographic information system (GIS). The method includes detecting on-screen view changes (those changes being relative to a previous view), and generating a geospatial search region defined by an instantaneous view specification. The method further includes requesting a view-dependent search for layer data based on the geospatial search region, the layer data limited to at least one of the geospatial search region and the geospatial search region plus an off-screen border region. The method further includes receiving results of the view-dependent search. In one particular case, requesting a view-dependent search for layer data based on the geospatial search region is carried out only in response to the relative view change being greater than a predefined threshold. In another such particular case, and in response to the relative view change not being greater than the predefined threshold, the method includes suppressing the view-dependent search. The method may include rendering the results into contents of virtual data layer, and may further include displaying that virtual data layer. In another particular case, requesting a view-dependent search for layer data based on the geospatial search region includes contacting a search server identified by a view-dependent network link (VDNL) search specification to initiate the view-dependent search, and submitting the VDNL search specification and the geo spatial search region to the search server. In one such case, the VDNL search specification specifies other information including at least one of importance of search, information related to quality of service, previous search latencies, previous search results, time of last search, previous search positions, previous viewpoint motions, and previous off-screen border region width profiles. In another such case, the off-screen border region has a width profile that is specified in the VDNL search specification. In another particular case, the off-screen border region has a width profile that is uniform around view frustum. In another particular case, the off-screen border region has a non-uniform width profile to reflect a bias based on an anticipated direction of motion of view specification. In another particular case, the off-screen border region is only provided on one to three sides of view frustum. In another particular case, the off-screen border region has a width profile that is dynamically controlled based on at least one of previous search latencies, viewpoint motions, and previous width profiles. In another particular case, the off-screen border region has a width profile that is dynamically controlled based at least one of desired quality of service, search server limits, bandwidth constraints, and relative importance of the view-dependent search relative to other view-dependent searches that may be simultaneously active. In another particular case, the off-screen border region has a width profile that has at least one of: a lower width limit and an upper width limit.

Another embodiment of the present invention provides a machine-readable medium (e.g., compact disk, diskette, server, or hard drive such as that of a client) encoded with instructions, that when executed by a processor, cause the processor to carry out a process for providing layered information in a GIS. This process can be, for example, similar to or a variation of the previously described method.

Another embodiment of the present invention provides a GIS for providing layered information. The system functionality (e.g., such as that of the previously described method or a variation thereof) can be implemented with a number of means, such as software (e.g., executable instructions encoded on one or more computer-readable mediums), hardware (e.g., gate level logic or one or more ASICs), firmware (e.g., one or more microcontrollers with I/O capability and embedded routines for carrying out the functionality described herein), or some combination thereof. The system can be implemented in a client-server environment, with some functionality carried out, for example, at the server and some at the client, or all at the client or local to the client, as will be appreciated in light of this disclosure.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

FIG. 1 illustrates an interactive GIS configured in accordance with an embodiment of the present invention.

DETAILED DESCRIPTION OF THE INVENTION

Figure 2A:
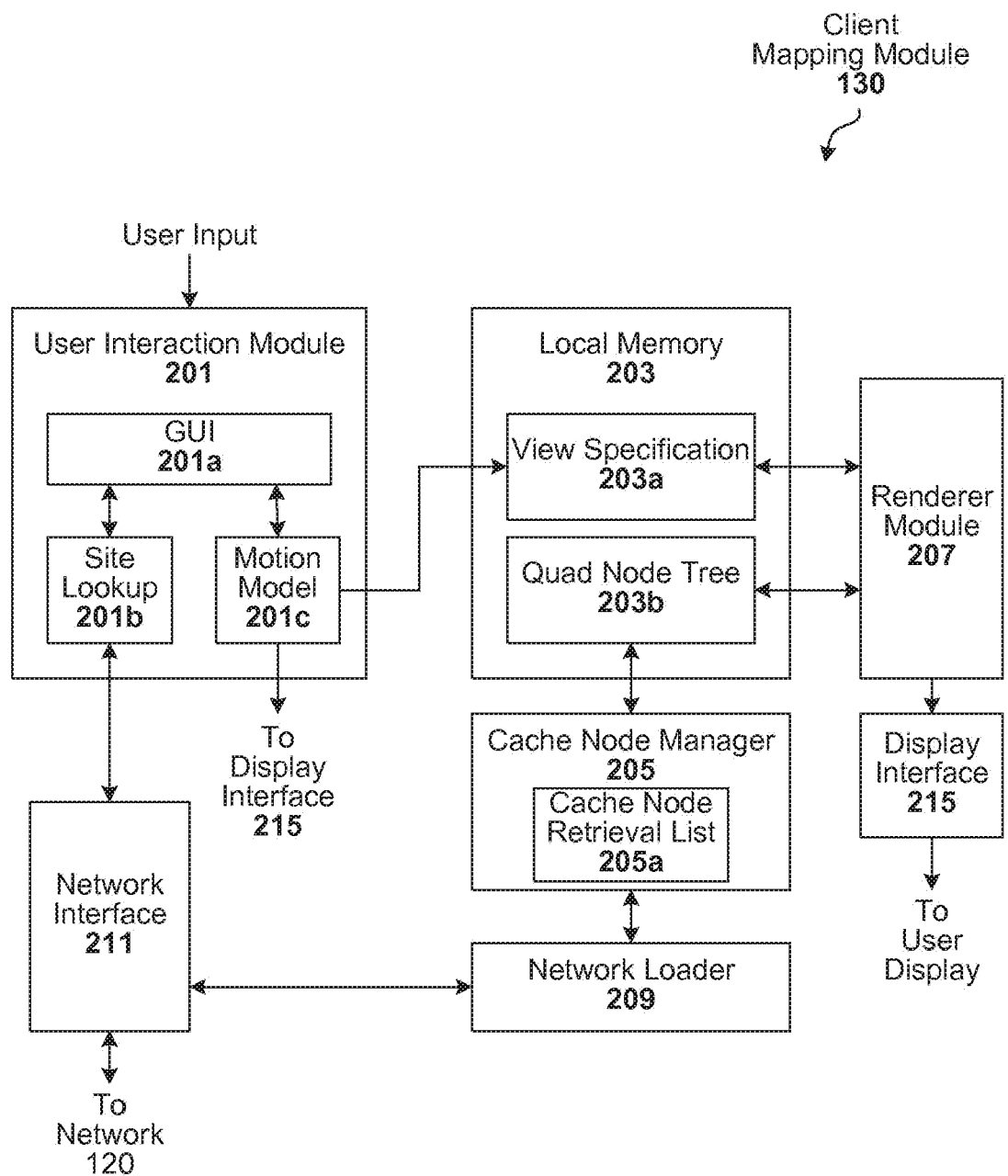
FIG. 2a illustrates a client-side mapping module of the GIS shown in FIG. 1, configured in accordance with an embodiment of the present invention.

Geographic information systems (GIS) and techniques are disclosed that provide users with a greater degree of flexibility, utility, and information. The system may be a distributed geographic information system (DGIS) including multiple components that communicate with one another. For purposes of this disclosure, assume that "GIS" includes both GIS and DGIS configurations.

General Overview

A GIS configured to carryout the techniques described herein can be implemented, for example, in a client-server architecture. Other configurations will be apparent in light of this disclosure. In accordance with one such embodiment of the present invention, client-side software operates (in conjunction with server-side software) to bring images of the Earth and other geospatial information to a user's computer so they can be seen by the user. In one example case, the client software is implemented using various software objects that are grouped in modules according to different functions that run independently from one another in the system.

In more detail, and in accordance with one particular embodiment, a motion model in the user interface module of the software uses client input to adjust the client's virtual viewing position and orientation. The motion model also determines a view specification which defines the client's viewable volume within a three-dimensional space (known as a frustum), and the position and orientation of the frustum with respect to a three-dimensional map. Once a view specification is determined, it is placed in local memory.

The view specification is read by a renderer, which is a software object that draws or "renders" drawable data. The renderer is grouped in a separate renderer module and repeats a processing cycle, which includes: (1) reading the view specification in local memory, (2) traversing a data structure in local memory, referred to as a quad node tree, and (3) drawing drawable data contained in quad nodes of the quad node tree. A quad node is a structure for organizing data residing in local memory. Each quad node may have a payload of data and up to four references to other files, each of which may be other quad nodes.

The references comprise a filename and a corresponding address in local memory (assuming the file exists in local memory). The files referenced by a quad node are referred to herein as the children of that quad node, and the referencing quad node is referred to as the parent. Quad node payloads may include various types of data and are limited to a maximum value. The amount of data needed to describe an area of a particular resolution may in some cases exceed this maximum value, such that the data must be split among parent and child quad nodes. Thus, data in a payload of a child quad node may be the same resolution as that of a parent quad node, but need not be as will be apparent in light of this disclosure.

When the renderer traverses the quad node tree, it will first look at the payload of data in a parent quad node. If the payload is drawable data, the renderer will compare a bounding box (a volume that contains the data) of the payload, if present, to the view specification. If the bounding box is completely disjoint from the view specification, the data will not be drawn, despite the fact that the quad node has already been downloaded from a remote server.

If the payload is considered appropriate to draw, the renderer will attempt to access each of the up to four references of the quad node. If the reference contains an address to a file in local memory, the renderer will go to that child quad node and look at the payload, repeating the process for each subsequent child quad node until it encounters a quad node with a payload that has a bounding box completely disjoint from the view specification. If the reference does not contain an address in local memory (i.e., the referenced file does not exist in local memory), the renderer cannot access the file, and will continue to move down the quad node tree without trying to obtain the file. In this embodiment, the renderer only reads from the quad node tree, and does not provide coordinate and resolution information to any other object.

The quad node itself has a built-in accessor function. When the renderer attempts to access a reference that has a filename, but no corresponding local address, this triggers the accessor function of the quad node to independently place its own address and the child reference number onto a cache node retrieval list, which comprises a list of information identifying files to be downloaded from remotes servers. A network loader in an independent network loader thread reviews the cache node retrieval list and requests only the files referenced on the list.

A cache node manager in an independent cache node manager thread allocates space in local memory and organizes files retrieved by the network loader into new quad nodes. The cache node manager also updates the parent quad nodes with the local memory address of these new child quad nodes. Therefore, on subsequent cycles of the renderer module, there will be additional quad nodes in local memory for the renderer to access. As in previous cycles, the renderer will look at the payload and draw all drawable data that does not fall completely outside the view specification. The renderer thread will continue this cycle until it reaches a quad node with a payload that has a bounding box completely disjoint from the view specification, or is otherwise inappropriate to draw. Thus, the renderer only draws what is already downloaded, and it only stops drawing when it encounters already downloaded data that has a bounding box completely disjoint from the view specification.

In addition to this architecture and functionality, a markup language is provided that facilitates communication between servers and clients of the interactive GIS. In one such embodiment, each server and client is programmed or otherwise configured to execute the markup language to carryout a number of GIS features, such as network links, ground overlays, screen overlays, placemarks, 3D models, and stylized GIS elements, such as geometry, icons, description balloons, polygons (the surface of extruded lines are considered polygons), and labels in the viewer by which the user sees the target area.

A number of techniques and features can be employed by various embodiments of the system. For instance, techniques for providing virtual tours of user-defined paths (e.g., driving directions) in the context of distributed geospatial visualization are provided. These techniques enable, for example, "fly through" of 3D satellite image map that is annotated with driving directions. Also, techniques for streaming and interactive visualization of filled polygon data are provided. These techniques enable, for instance, buildings and other map features to be provided in 3D, with size parameters (e.g., building height) used as metric in determining when to show the 3D features at the various zoom levels.

Also, a network link mechanism is provided to iteratively fetch remote content for a GIS application. A time-based network link fetches placemark files when triggered to do so by the passage of time (e.g., "Get file X every 20 seconds"). This feature allows an external server (e.g., traffic server or earthquake data server or airplane location data) to be designated and periodically queried for data. That data can then be populated onto a map. A view-dependent network link makes a search query when triggered by the motion of the view specification. This technique essentially makes a data layer out of the query. For instance, in response to user entering "schools," turn-on all schools within mapping system (e.g., both in the viewing window and outside viewing window to some degree) so as user scrolls, pans, or otherwise moves the map, the corresponding new schools come into view (while other schools go out of view).

Also, techniques for enabling ambiguous search requests in a GIS are provided. Such techniques enable geospatial context for an arbitrary query. For instance, in response to user entering a flight number, the system would show the location of the corresponding plane on a map. Likewise, in response to user entering a UPS tracking #, the system would show the location of the corresponding package on the map. The system can "fly" to the location of the searched item. Relational searching is also enabled. For instance, in response to user entering "diet," show location of hospitals, exercise clubs, Jamba Juice, Whole foods, etc. An auto zoom features shows location of all relevant hits.

Each of these techniques/features, as well as others, will be discussed in turn in greater detail, and can be implemented in an interactive GIS as will be apparent in light of this disclosure.

System Architecture

FIG. 1 illustrates an interactive GIS configured in accordance with an embodiment of the present invention.

The system combines satellite imagery, photographs, maps and other geographic data, and Internet search capability so as to enable a user to view imagery of the planet and related geographic information (e.g., locales such as islands and cities; and points of interest such as local restaurants, hospitals, parks, hotels, and schools). The system further allows the user to conduct local searches, get travel directions to a location or between two locations. The user can virtually fly from space (e.g., some vantage point above the Earth) to and around an entered target address or location, such as his neighborhood or other area of interest. Results are displayed in a 3D view. The user can tilt and rotate the view to see 3D terrain and buildings. The user can also annotate maps, and/or enable data layers to show, for example, parks, schools, hospitals, airports, shopping, and other points of interest or locales. The user can also layer multiple searches, save results to folders, and share search results and maps with others. In addition, a data exchange format referred to herein as KML (Keyhole Markup Language) enables the user to share useful annotations and view thousands of data points created by other system users.

As can be seen, the system includes a client-server architecture, where the server-side communicates with one or more clients 125 via a network 120. The server-side includes a GIS server system 105, an image database 110, and a map information provider 115. On the client-side, each client 125 includes a mapping module 130 that operates as a geospatial browser 130a (or other suitable viewer), so as to provide the user with an interface to the system. In one embodiment, at least some of the mapping modules 130 of the clients 125 further include development modules that end-users can use to generate data files describing particular presentations of GIS data, as is explained in further detail in the previously incorporated U.S. application Ser. No. 11/426,831, filed Jun. 27, 2006, titled "Markup Language for an Interactive Geographic Information System". In addition, the system may further include one or more third-party content servers 140 for providing content to network links referring to the geospatial description file 140a encoded thereon. The geospatial description file 140a can be, for example, a KML file or other suitable script, as will be explained with reference to the network link.

The GIS server system 105 is in communication with the image database, which includes image data (e.g., digital maps, satellite images, aerial photographs, street-level photographs). Non-image data such as tabular data (e.g., digital yellow and white pages), and map layer data (e.g., database of diners, restaurants, museums, and/or schools; databases of seismic activity; database of national monuments; etc) can also be stored in database 110 or in some other storage facility accessible to server system 105. The database 110 (and others, if applicable) is populated (e.g., offline or in real-time) by the GIS server system 105.

The map information provider 115 provides server system 105 with map information (e.g., satellite data, street-level photographs, aerial photographs, digital maps, elevation data, longitude/latitude data, GPS coordinates). The provided map information can be collected, for example, as a function of the server system 105 (e.g., map information provider 115 is a database of map information collected by the server system 105). Alternatively, or in addition to, various third party map data services can be used to provide map information to server system 105. All such map internal/external information sources are generally represented by map information provider 115. In any case, the GIS server system 105 receives requests for map information, and responds to those requests, via the network 120. The map information provider 115 can also be further configured to respond directly to user requests for geographic data. In one embodiment, the GIS server system 105 encodes the map information in one or more data files and provides the files to the requestor.

Note that other modules may be included in the system, and that illustrated modules may be rearranged. For instance, the database 110 can be integrated into the GIS server system 105. Also, the map information provider 115 can be integrated into the GIS server system 105. Other configurations will be apparent in light of this disclosure, and the present invention is not intended to be limited to any particular one. Any number of modules can be programmed or otherwise configured to carry out the server-side functionality described herein.

A client 125 on which the mapping module 130 runs can be, for example, a desktop or laptop computer. Alternatively, a client 125 can be a wireless device, such as a personal digital assistant (PDA), smart phone, a navigation system located in a vehicle, a handheld GPS system, or other such devices/systems. In short, the client 125 can be any computer, device, or system that can execute the mapping module 130, and allows the user to interact with the GIS server system 105 (e.g., requesting maps, driving directions, and/or data searches, and then receiving data files in response). In the embodiment shown, the mapping module 130 executes or otherwise runs as geospatial browser 130a.

The GIS server system 105 can be implemented with conventional or custom technology. Numerous known server architectures and functionalities can be used to implement a GIS server. Further note that the GIS server system 105 may include one or more servers operating under a load balancing scheme, with each server (or a combination of servers) configured to respond to and interact with clients via the network 120. In one particular embodiment, the GIS server system 105 is implemented as discussed in the previously incorporated U.S. application Ser. No. 10/270,272, titled "Server for Geospatially Organized Flat File Data."

In general, when the user enters a search query (e.g., via the geospatial browser 130a presented by the client-side mapping module 130), it is put into a request and sent to the GIS server system 105 via the network 120. The server system 105 then determines what the search query is for, and responds with the appropriate data from various sub-systems, such as geo-coders, routing engines, and local search indexes, in a format that the requesting client 125 can use to present the data to the user (e.g., via the geospatial browser 130a).

In addition to any conventional functionality, the GIS server system 105 is further configured to interact with the mapping module 130, as will be apparent in light of this disclosure. The mapping module 130 is discussed with further reference to FIG. 2a. In one embodiment, the server system 105 responds to the requesting client 125 by encoding data responsive to the request into one or more data files and providing the files to the client.

The network 120 may be any type of communications network, such as a local area network (e.g., intranet), wide area network (e.g., Internet), or some combination thereof. Alternatively, the network 120 may be a direct connection between a client 125 and the GIS server system 105. In general, communication between the server system 105 and a client 125 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Used in conjunction with the GIS server system 105, the geospatial browser 130a interface provided by the mapping module 130 provide a mapping system that serves maps and GIS data over the network 120. The system allows users to visualize, select, annotate, and explore geographic information all over the world or in a particular region, city, town, or other locale.

Client-Side Mapping Module

FIG. 2a illustrates a client-side mapping module 130 of the GIS shown in FIG. 1, configured in accordance with an embodiment of the present invention. As previously explained, components of the mapping module 130 can be implemented as software running on a user's computer (client 125), which then interacts with a GIS server system to bring images of the Earth and other geospatial information to the client 125 for viewing by the user. In operation, and in one particular configuration, various software objects are grouped in modules according to several functions that can run asynchronously (time independently) from one another. Numerous software implementations and functional module interactions will be apparent in light of this disclosure.

As can be seen, the module 130 includes a user interaction module 201, a local memory 203, a cache node manager 205, a renderer module 207, a network loader 209, a network interface 211, and a display interface 215. In general, the user interaction module 201 receives user input regarding the location that the user desires to view, and through a motion model 201c, constructs a view specification 203a. In the renderer module 207, the renderer draws whatever drawable data has been previously brought back to the user's computer, except that the renderer uses the view specification 203a to decide what not to draw from that data. The cache node manager module 205 runs in an asynchronous thread of control. The cache node manager module 205 builds a quad node tree 203b by populating it with quad nodes retrieved from the remote server system (via network 120). Each of these and other modules will now be described in further detail.

The user interaction module 201 includes a graphical user interface (GUI) 201a, an optional site lookup routine 201b, and a motion model 201c. In the user interaction module 201, the user inputs location information using the GUI 201a, which results in the generation of the view specification 203a, as will be described in turn. The view specification 203a is placed in local memory 203, where it is used by a renderer in the renderer module 207, as also will be described in turn. The GUI 201a is discussed in further detail with reference to FIG. 3a.

Certain types of user input, including addresses and the names of well known places typed into a text input field of the GUI 201a, trigger an optional site lookup routine 201b. The site lookup routine 201b sends the address or name to the GIS server system 105 (via network 120), and in response, the latitude and longitude corresponding to the address or name is returned to the client mapping module 130. If a user has selected a geographical location by double-clicking on it within the display window of the GUI 201a, then the latitude and longitude corresponding to the selected location on the 3D map can be determined locally. In one particular embodiment, a default altitude over the selected location is used. A user can adjust the default altitude using the GUI 201a (e.g., zoom controls), as desired.

The motion model 201c uses location information received via the GUI 201a to adjust the position and orientation of a "virtual camera" viewing the displayed 3D map. The user sees the displayed 3D map on his or her computer monitor from the standpoint of this virtual camera. The motion model 201c also determines the view specification 203a based on the position of the virtual camera, the orientation of the virtual camera, and the horizontal and vertical fields of view of the virtual camera.

The view specification 203a defines the virtual camera's viewable volume within the 3D space, known as a frustum, and the position and orientation of the frustum with respect to the 3D map. The frustum is in the shape of a truncated pyramid. The frustum has minimum and maximum view distances that can change depending on the viewing circumstances. As the user's view of the 3D map is manipulated using the GUI 201a, the orientation and position of the frustum changes with respect to the 3D map. Thus, as user input is received, the view specification 203a changes. The view specification 203a is placed in local memory 203, where it is used by a renderer in the renderer module 207.

In accordance with one embodiment of the present invention, the view specification 203a specifies three main parameter sets for the virtual camera: the camera tripod, the camera lens, and camera focus capability. The camera tripod parameter set specifies the following: the virtual camera position: X, Y, Z (three coordinates); which way the virtual camera is oriented relative to a default orientation, such as heading angle (e.g., north?, south?, in-between?); pitch/tilt (e.g., level?, down?, up?, in-between?); and yaw/roll (e.g., level?, tilt clockwise?, tilt anti-clockwise?, in-between?). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn).

In one example operation, and with the above camera parameters in mind, assume the user presses the left-arrow (or right-arrow) key. This would signal the motion model 201c that the view should move left (or right). The motion model 201c implements such a ground level "pan the camera" type of control by adding (or subtracting) a small value (e.g., 1 degree per arrow key press) to the heading angle. Similarly, to move the virtual camera forward, the motion model 201c would change the XYZ coordinates of the virtual camera's position by first computing a unit-length vector along the view direction (HPR), and then adding the XYZ sub-components of this vector to the camera's position XYZ after scaling each sub-component by the desired speed of motion. In these and similar ways, the motion model 201c adjusts the view specification 203a by incrementally updating XYZ and HPR to define the "just after a move" new view position.

The renderer module 207 has cycles corresponding to the display device's video refresh rate, typically 60 Hz (cycles per second). In one particular embodiment, the renderer module 207 performs a cycle of (i) waking up, (ii) reading the view specification 203c that has been placed by the motion model 201c in a data structure accessed by the renderer, (iii) traversing a quad node tree 203b in local memory 203, and (iv) drawing drawable data contained in the quad nodes residing in the quad node tree 203b. The drawable data may be associated with a bounding box (a volume that contains the data, or other such identifier). If present, the bounding box is inspected to see if the drawable data is potentially visible within the view specification 203a. Potentially visible data is then drawn, while data known not to be visible is ignored. Thus, the renderer uses the view specification 203a to determine whether the drawable payload of a quad node resident in the quad node tree 203b is not to be drawn, as will now be more fully explained.

Initially, and in accordance with one embodiment of the present invention, there is no data within the quad node tree 203b to draw, and the renderer module 207 draws a star field by default (or other suitable default display imagery). The quad node tree 203b is the data source for all drawing that the renderer 207 does except for this star field. The renderer 207 traverses the quad node tree 203b by attempting to access each quad node resident in the quad node tree 203b. As explained herein, each quad node is a data structure that has up to four references and an optional payload of data. If a quad node's payload is drawable data, the renderer 207 will compare the bounding box of the payload (if any) against the view specification 203a, drawing it so long as the drawable data is not wholly outside the frustum and is not considered inappropriate to draw based on other factors. These other factors may include, for example, distance from the camera, tilt, or other such considerations. If the payload is not wholly outside the frustum and is not considered inappropriate to draw, then the renderer 207 also attempts to access each of the up to four references in the quad node. If a reference is to another quad node in local memory (e.g., memory 203 or other local memory), the renderer 207 will attempt to access any drawable data in that other quad node and also potentially attempt to access any of the up to four references in that other quad node. The renderer's 207 attempts to access each of the up to four references of a quad node are detected by the quad node itself, as will now be explained.

As previously explained, a quad node is a data structure that may have a payload of data and up to four references to other files, each of which in turn may be a cache node. In some cases, a file contains not only the referenced child, but descendants of that child as well. These aggregates are known as cache nodes and may include several quad nodes. Such aggregation takes place in the course of database construction. In some instances, the payload of data is empty. Each of the references to other files comprises, for instance, a filename and a corresponding address in local memory for that file, if any. Initially, the referenced files are all stored on one or more remote servers (e.g., included in GIS server system 105) and there is no drawable data present on the user's computer. The files referenced by a quad node are referred to herein as the children of that quad node, and the referencing quad node is referred to herein as the parent.

Quad nodes and cache nodes have built-in accessor functions. As previously explained, the renderer's 207 attempts to access each of the up to four references of a quad node are detected by the quad node itself. Upon the renderer's 207 attempt to access a child quad node that has a filename but no corresponding address, the parent quad node places (by operation of its accessor function) that filename onto a cache node retrieval list 205a. The cache node retrieval list 205a comprises a list of information identifying cache nodes to be downloaded from the GIS server system 105. If a child of a quad node has a local address that is not null, the renderer uses that address in local memory 203 to access the child quad node.

Quad nodes are configured so that those with drawable payloads may include within their payload a bounding box or other location identifier. The renderer 207 performs a view frustum cull, which compares the bounding box/location identifier of the quad node payload (if present) with the view specification 203a. If the bounding box is completely disjoint from the view specification 203a (i.e., none of the drawable data is within the frustum), the payload of drawable data will not be drawn, even though it was already retrieved from the GIS server system 105 and stored on the user's computer. Otherwise, the drawable data is drawn. The view frustum cull determines whether or not the bounding box (if any) of the quad node payload is completely disjoint from the view specification 203a before the renderer 207 traverses the children of that quad node. If the bounding box of the quad node is completely disjoint from the view specification 203a, the renderer 207 does not attempt to access the children of that quad node. A child quad node never extends beyond the bounding box of its parent quad node. Thus, once the view frustum cull determines that a parent quad node is completely disjoint from the view specification, it can be assumed that all progeny of that quad node are also completely disjoint from the view specification 203a.

Quad node and cache node payloads may contain data of various types. For example, cache node payloads can contain satellite images, text labels, political boundaries, 3-dimensional vertices along with point, line or polygon connectivity for rendering roads, and other types of data. The amount of data in any quad node payload is limited to a maximum value. However, in some cases, the amount of data needed to describe an area at a particular resolution exceeds this maximum value. In those cases, such as processing vector data, some of the data is contained in the parent payload and the rest of the data at the same resolution is contained in the payloads of the children (and possibly even within the children's descendents). There also may be cases in which children may contain data of either higher resolution or the same resolution as their parent. For example, a parent node might have two children of the same resolution as that parent, and two additional children of different resolutions (e.g., higher) than that parent.

The cache node manager 205 thread and each of one or more network loader 209 threads operate asynchronously from the renderer module 207 and the user interaction module 201. The renderer module 207 and user interaction module 201 can also operate asynchronously from each other. In some embodiments, as many as eight network loader 209 threads are independently executed, each operating asynchronously from the renderer module 207 and user interaction module 201. The cache node manager 205 thread builds the quad node tree 203b in local memory 203 by populating it with quad nodes retrieved from the GIS server system 105 by network loader 209 threads. The quad node tree 203b begins with a root node when the client mapping module 130 is launched or otherwise started. The root node contains a filename (but no corresponding address) and no data payload. As previously described, this root node uses a built-in accessor function to self-report to the cache node retrieval list 205a after it has been traversed by the renderer 207 for the first time.

In each network loader 209 thread, a network loader traverses the cache node retrieval list 205a (which in the embodiment shown in FIG. 2a is included in the cache manager 205a, but can also be located in other places, such as the local memory 203 or other storage facility) and requests the next cache node from the GIS server system 105 using the cache node's filename. The network loader only requests files that appear on the cache node retrieval list 205a. The cache node manager 205 allocates space in local memory 203 (or other suitable storage facility) for the returned file, which is then organized into one or more new quad nodes that are descendents of the parent quad node. The cache node manager 205 can also decrypt or decompress the data file returned from the GIS server system 105, if necessary (i.e., to complement any encryption or compression on the server-side). The cache node manager 205 updates the parent quad node in the quad node tree 203b with the address corresponding to the local memory 203 address for each newly constructed child quad node.

Separately and asynchronously in the renderer module 207, upon its next traversal of the quad node tree 203b and traversal of this updated parent quad node, the renderer 207 will now find the address in local memory corresponding to the child quad node and be able to access the child quad node. The renderer's traversal 207 of the child quad node then progresses according to the same steps that were followed for the parent quad node. This continues through the quad node tree 203b until a node is reached that is completely disjoint from the view specification 203a or is considered inappropriate to draw based on other factors as previously explained.

In this particular embodiment, note that there is no communication between the cache node manager 205 thread and the renderer module 207 other than the renderer's 207 reading of the quad nodes written or otherwise provided by the cache node manager 205 thread. Further note that, in this particular embodiment, cache nodes and thereby quad nodes continue to be downloaded until the children returned contain only payloads that are completely disjoint from the view specification 203a or are otherwise unsuitable for drawing, as previously explained.

The network interface 211 (e.g., network interface card or transceiver) is configured to allow communications from the mapping module 130 to be sent over the network 120, and to allow communications from the remote server system 105 to be received by the mapping module 130. Likewise, the display interface 215 (e.g., display interface card) is configured to allow data from the mapping module to be sent to a display associated with the user's computer, so that the user can view the data. Each of the network interface 211 and display interface 215 can be implemented with conventional technology.

Quad Node Tree

Figure 2B:
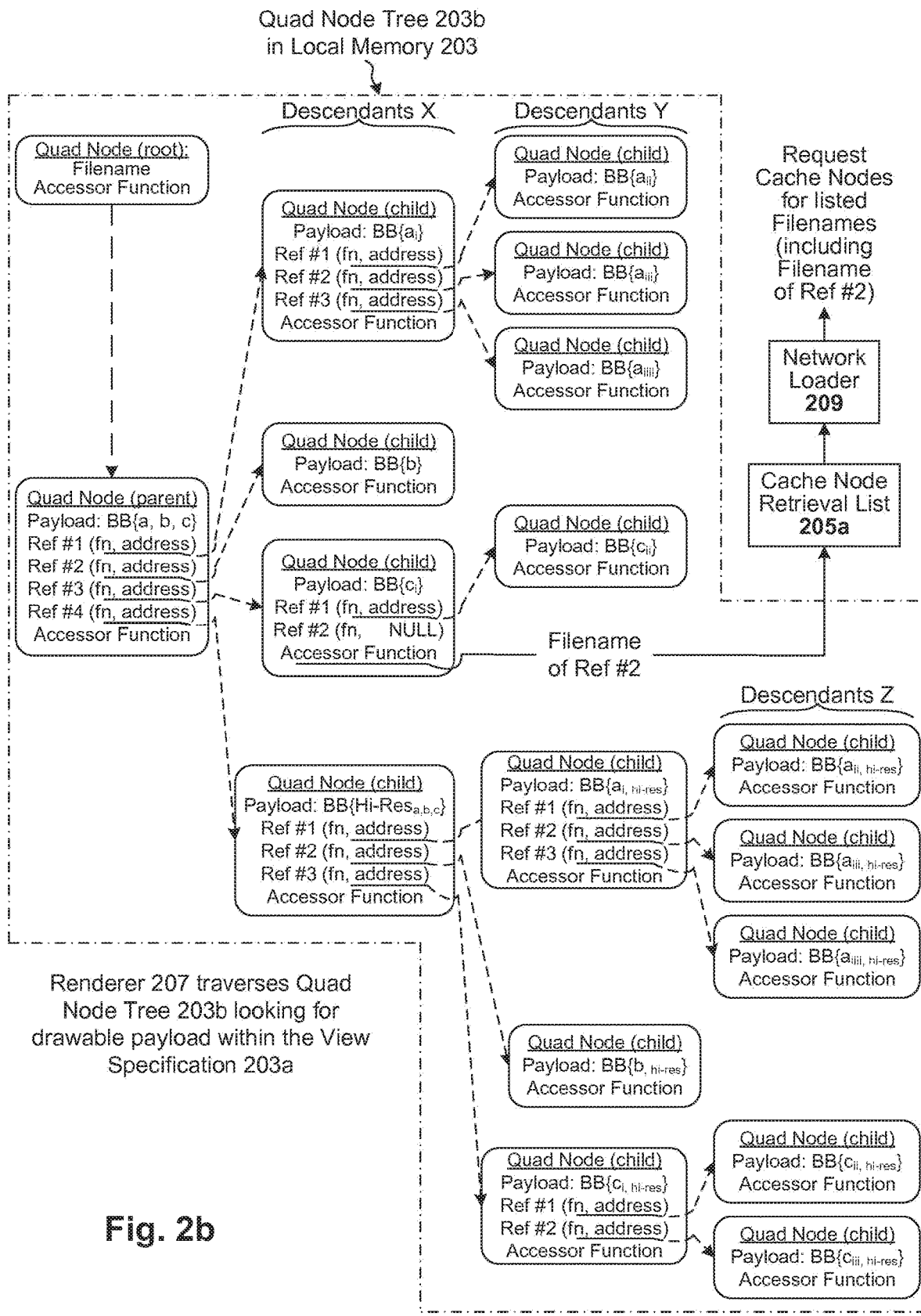
FIGS. 2b and 2c illustrate a quad node tree shown in FIG. 1, and a cache node retrieval process, configured in accordance with an embodiment of the present invention.
Figure 2C:
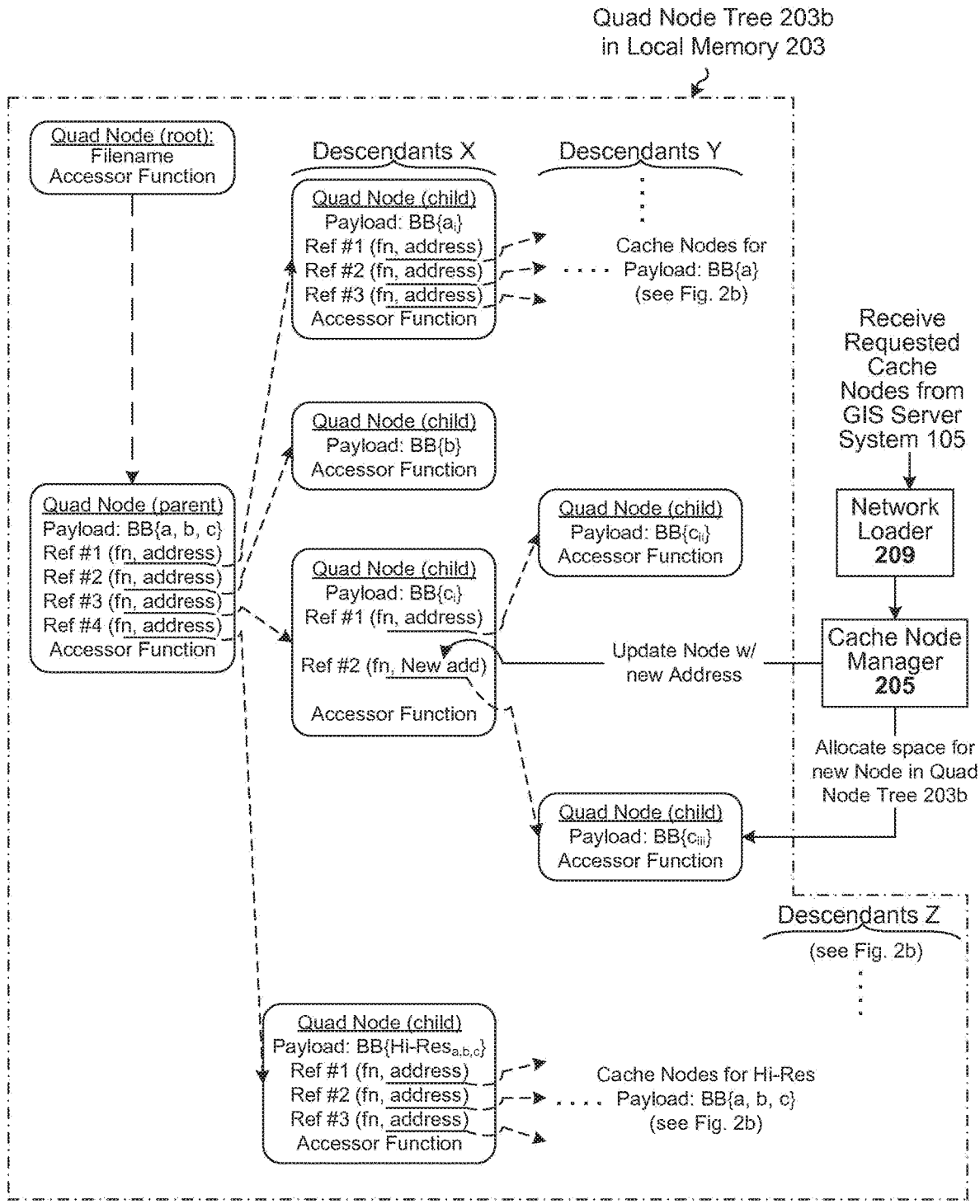

FIGS. 2b and 2c illustrate one example of quad node tree 203b shown in FIG. 1, and a cache node retrieval process, configured in accordance with an embodiment of the present invention. As can be seen in FIG. 2b, this example tree 203b currently has a root node, a parent node, four children nodes, and a number of additional descendants from those four children nodes. Each node has a built-in accessor function.

As previously explained, the cache node manager module 205 builds the quad node tree 203b by populating it with quad nodes retrieved from the remote server system 105. The quad nodes used to populate the tree 203b are identified by the renderer 207, which runs asynchronously to the cache node manager 205. In particular, the renderer 207 traverses the quad node tree 203b looking for drawable payload data that is within the current view specification 203a. When the renderer 207 attempts to access a quad node reference that has a filename, but no corresponding local address (such as the case with the root node, or the $3^{rd}$ child node of the "descendants X" shown in FIG. 2b), this triggers the accessor function of that quad node to independently place its own address and the child reference number onto a cache node retrieval list 205a, which comprises a list of information identifying files to be downloaded from the remote server system 105. An independent network loader 209 thread periodically reviews the cache node retrieval list 205a, and requests only the files referenced on the list. It is through these asynchronous processes that the quad node tree 203b is built and maintained during a given user session.

In the example shown, the root node has already been accessed by the renderer 207, which effectively caused the downloading of the parent quad node as explained herein. This example parent quad node includes a payload and four references (Ref #1, Ref #2, Ref #3, and Ref #4) to other quad nodes, which are the children of that parent. The payload has a bounding box (designated as "BB" in FIGS. 2b and 2c) that includes data "a, b, c." This payload can include, for example, satellite images, text labels, political boundaries, 3-dimensional vertices along with point, line or polygon connectivity for rendering roads, and other types of data as will be apparent in light of this disclosure. The data is designated with "a, b, c" in this example only to show how data can be represented using multiple quad nodes when the data cannot fit in a single quad node, and is not intended to implicate any particular node/tree/data structures or types. Each reference includes a filename (fn) of a child node, and an address in local memory 203 where that file can be located.

Once the renderer 207 accesses the parent node and determines that its payload is drawable and not completely outside the frustum of the view specification 203a, it draws that payload. The renderer 207 also accesses each of the four reference files, thereby creating a generation of child nodes (generally designated as descendants X in FIGS. 2b and 2c), which includes four children. From top to bottom: the first child node includes payload having a bounding box that includes data designated with $a_i$ and three reference files (Ref #1, Ref #2, and Ref #3); the second child node includes payload having a bounding box that includes data designated with b and no reference files; the third child node includes payload having a bounding box that includes data designated with $c_i$ and two reference files (Ref #1 and Ref #2); and the fourth child node includes payload having a bounding box that includes high-resolution (Hi-Res) data designated with a, b, c and three reference files (Ref #1, Ref #2, and Ref #3).

Each of these descendant X children nodes is accessed in turn by the renderer 207, so that the respective payloads can be drawn (if appropriate) and reference files can be accessed (if appropriate). In this example, when the renderer 207 accesses the second reference (Ref #2) of the $3^{rd}$ child node of the descendants X shown in FIG. 2b, it encounters a filename with a NULL address. As previously explained, this triggers the accessor function of that $3^{rd}$ child node to independently place its own address and the corresponding reference number (Ref #2) onto the cache node retrieval list 205a. The network loader 209 then causes the listed files (including the file associated with Ref #2) to be downloaded from the remote server system 105. As can be seen in FIG. 2c, the requested file is received via the network loader 209 and provided to the cache node manager 205. The cache node manager 205 then allocates space in local memory 203 for the returned file, and organizes it into a new child quad node (included in descendants Y), which is a descendent of the $3^{rd}$ child node of descendants X. The cache node manager 205 also updates the $3^{rd}$ child node with the new address (New add) of that allocated space.

Once the quad node for Ref 2 is created by operation of the cache node manager 205, the child nodes of descendants Y include eight children. From top to bottom: the first child node includes payload having a bounding box that includes data designated with $a_{ii}$ and no reference files; the second child node includes payload having a bounding box that includes data designated with $a_{iii}$ and no reference files; the third child node includes payload having a bounding box that includes data designated with $a_{iiii}$ and no reference files; the fourth child node includes payload having a bounding box that includes data designated with $c_{ii}$ and no reference files; the fifth child node includes payload having a bounding box that includes data designated with $c_{iii}$ and no reference files; the sixth child node includes payload having a bounding box that includes high resolution data designated with $a_{i,\ hi\text{-}res}$ and three reference files (Ref #1, Ref #2, and Ref #3); the seventh child node includes payload having a bounding box that includes high resolution data designated with $b_{,\ hi\text{-}res}$ and no reference files; and the eighth child node includes payload having a bounding box that includes high resolution data designated with $c_{i,\ hi\text{-}res}$ and two reference files (Ref #1 and Ref #2).

Descendants Z include the child nodes specified by the references of the sixth and eighth child nodes of descendants Y, include additional high resolution payload data for a and c, as can be seen. The renderer 207 will process the high resolution quad nodes, depending on the data requested by the user. In general, higher zoom levels (lower viewing altitudes) require higher resolution image data.

Graphical User Interface

Figure 3A:
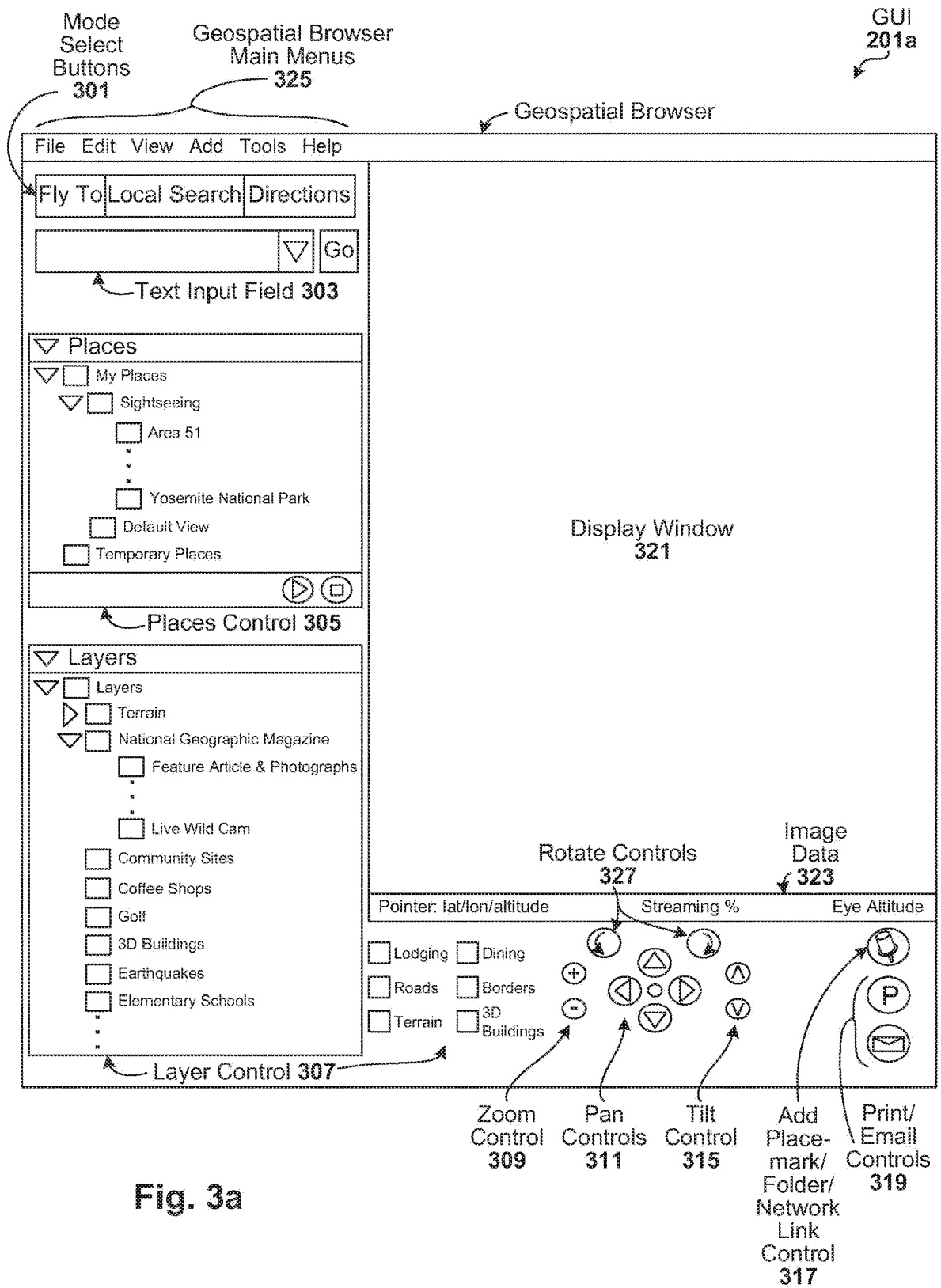
FIG. 3a illustrates a graphical user interface (GUI) of the GIS shown in FIG. 2a, configured in accordance with an embodiment of the present invention.

The GUI 201a is used to receive input from a user. FIG. 3a illustrates one particular embodiment of the GUI 201a, which operates as a geospatial browser that includes a display window 321 for displaying a 3D map, and a text input field 303 for entering location information such as latitude and longitude, an address and/or zip code, or the name of a well-known site (e.g., "Lincoln Memorial" or "Area 51"). The GUI 201a has a number of modes in which it can operate, including Fly To mode, Local Search mode, and Directions mode, as shown by mode select buttons 301. Fly To mode is shown in FIG. 3a, where any location (e.g., New York City or a zip code or the "White House") can be entered into field 303, and the display window 321 will automatically zoom out and then slide over to and then zoom in to the target location, giving the effect of virtual flying (as the display window 321 shows imagery of the route from the current location to the target location). The Local Search mode allows the user to search for local businesses (e.g., "pizza") and points of interest (e.g., museums) in either the currently viewed location, or in a user-specified location (in this mode, a first text input field can be provided to indicate what is being searched for and a second text input field can be provided to indicate where to search). The Directions mode allows the user to specify start and stop locations (in this mode, a first text input field can be provided to indicate the start location and a second text input field can be provided to indicate the stop location), and then provides a map and written directions for traveling between those locations.

The GUI 201a also includes a zoom control 309 for adjusting the viewing altitude, a tilt control 315 for adjusting the viewing angle, rotation controls 327 for rotating the view left and right, and a set of panning controls 311 to view areas of the 3D map to the left, right, top or bottom of the display window.

The GUI 201a also includes places control 305, which allows the user to organize saved data in a Places panel in a way similar to how a user would organize files and folders on a computer's hard drive. For example, the places control 305 allows the user to create folders, reorder placemarks or folders, rename a placemark or folder, remove/delete a placemark or folder, and empty a folder's contents. Also, the user can select (e.g., check box or other such GUI control mechanism) various places designated in the places control 305, and then select a "play" function button (lower right of places control 307 panel) so that a virtual tour of those selected places will then be displayed in the window 321. Stop and pause functions can also be provided to give the user more control over the virtual tour. As will be explained in turn, navigation of such user-defined paths can be computed by the mapping module 130.

The GUI 201a also includes layer control 307, which provides a variety of data points of geographic interest (e.g., points of interest, as well as map, road, terrain, and building data) that a user can select to display over the viewing area. In the embodiment shown in FIG. 3a, example commonly used layers are available on the Navigation panel (e.g., Lodging, Dining, Roads, Boarders, Terrain, and 3D Buildings) and a full list of layers is available in the Layers panel (e.g., National Geographic Magazine articles relevant to a particular area, Golf courses/ranges, Coffee Shops, Community Sites, earthquake epicenters, etc).

The GUI 201 of this example embodiment also displays image data 323 in the lower portion of the display window 321, including pointer/cursor coordinates (e.g., lat/lon/altitude), streaming percentage completion, and eye altitude (e.g., feet). The eye altitude data is particularly useful when the user is adjusting tilt control to get a closer look at a target location, in that the user knows how close to the ground the current view is based on the current eye altitude. The GUI 201a further includes print and email controls 319 (so as to allow for printing and emailing of locations and/or images). Also, the GUI 201a includes an add placemark/folder/network link control 317, which allows the user to create or otherwise add new placemarks, folders, and/or network links. The geospatial browser main menus 325 include the File menu (e.g., functions such as Open, Save, Save As, Email/Email View, Share with Online Community, Print, Logout), Edit (e.g., includes functions such as Find in Places, Find Next, Find Prev, Copy, Snapshot View, Past Delete, Rename, Refresh, Apply Style Template, Delete Content, Save to My Places, Clear Search History, and Properties), View (e.g., includes functions and selectable display features such as Full Screen, View Size, Compass, Status Bar, Lat/Lon Grid, Overview Map, and Play Tour), Add (e.g., includes functions to allow the addition of Placemarks, Folders, Image Overlays, and Network Links), Tools (e.g., includes selectable tools such as Navigation panel, Places panel, Layers panel, Measuring tool, and Web Search panel), and Help (e.g., includes access to online help center and other informative sources). Note that the add placemark/folder/network link control 317 can be configured to provide menu options that correspond to the options in the Add menu of the geospatial browser main menus 325. Further note that various places and layers of the Places and Layers panels can be expanded (or condensed) to show additional (or fewer) sub-places and sub-layers (e.g., click GUI arrow pointing at place/layer label to expand or show sub-places/sub-layers, or click GUI arrow pointing down to condense or hide sub-places/sub-layers).

Numerous GUI configurations and underlying functionalities will be apparent in light of this disclosure, and the present invention is not intended to be limited to any one particular configuration. The displayed 3D maps can be manipulated using the GUI 201a. The GUI 201a can be used to reposition the current map view, for example, by clicking and dragging in the display window 321. A user may also select a geographical location by double-clicking on it within the display window 321.

3D Buildings

As previously explained with reference to FIG. 3a, the Layers panel includes a variety of data layers that can be selected to display over the viewing area. Example data layers include points of interest as well as map, road, terrain, and 3D buildings. The 3D buildings can be generated (as will be discussed with reference to FIG. 5) for a number of major cities such as Boston, London, Sidney, Washington, D.C., and San Francisco, to name a few.

Figure 3B:
FIG. 3b demonstrates an example view when a 3D building layer is turned on and the viewer is positioned within a reasonable viewing altitude over a target city, in accordance with one embodiment of the present invention.
Figure 3C:
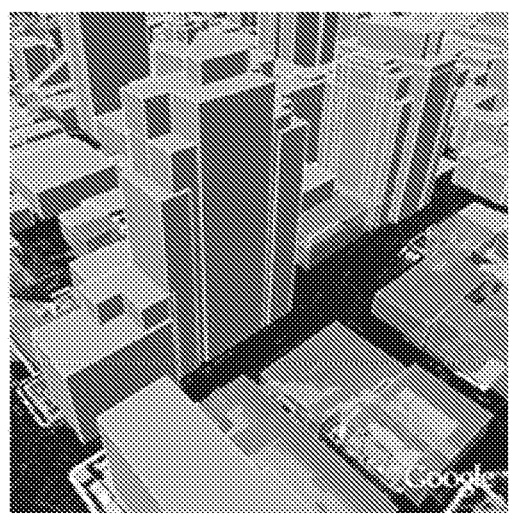
FIG. 3c demonstrates an example zoomed in and tilted view of a 3D building cluster, in accordance with one embodiment of the present invention.

To view these 3D buildings, the 3D building layer is turned on by selecting the check box included in the layer control 307. Then, the viewer is positioned within a reasonable viewing altitude over the target city. In accordance with one embodiment of the present invention, the 3D buildings start to appear from an eye-elevation of 3,000 to 12,000 feet. One such example view is shown in FIG. 3b. Recall that the eye altitude meter on the lower right of the 3D viewer (image data 323) can be checked to determine the current viewing height. The 3D buildings appear as light grey objects over the imagery of the city. As the user zooms in, more details will appear until the entire shape of a building can be seen. The tilt control 315 and rotate controls 327 can be used to get the desired view of the buildings. FIG. 3c demonstrates an example zoomed in and tilted view of a building cluster.

Virtual Tour of User-Defined Path

One embodiment of the present invention is configured to compute an optimal flight path to visualize travel along a path defined by the user, such as driving or walking directions or any other path (e.g., flying directions, where the tour focuses more on the individual destinations than lengthy pathways in between) on the surface of the planet in the context of distributed geospatial visualization.

In particular, given a list of geo-referenced waypoints on Earth (described for example as a list of latitude/longitude pairs associated with a number of selected places in the Places panel of the GUI 201a) and some viewing parameters (e.g., camera speed, range and tilt angle with respect to vertical), the interactive GIS is adapted to compute an optimal flight path that allows users to visualize that path. This virtual tour capability can be applied to driving directions results, for instance, to allow previewing a route. In this sense, the mapping module 130 can then play a tour of computed camera waypoints, whether for driving directions, pedestrian walking and hiking paths, public transportation, and any other such paths that can be traversed and/or previewed. In one particular embodiment, the technique simulates a helicopter flying along the chosen path (e.g., driving directions between two points, or a path created manually using drawing tools) at a constant ground speed with a constant tilt angle. In addition, the visually rich virtual driving/walking/riding/flying experience provided by approaching, transiting, and then reviewing a planned path within the context of a simulated Earth environment, which may include 3-dimensional views.

Figure 4:
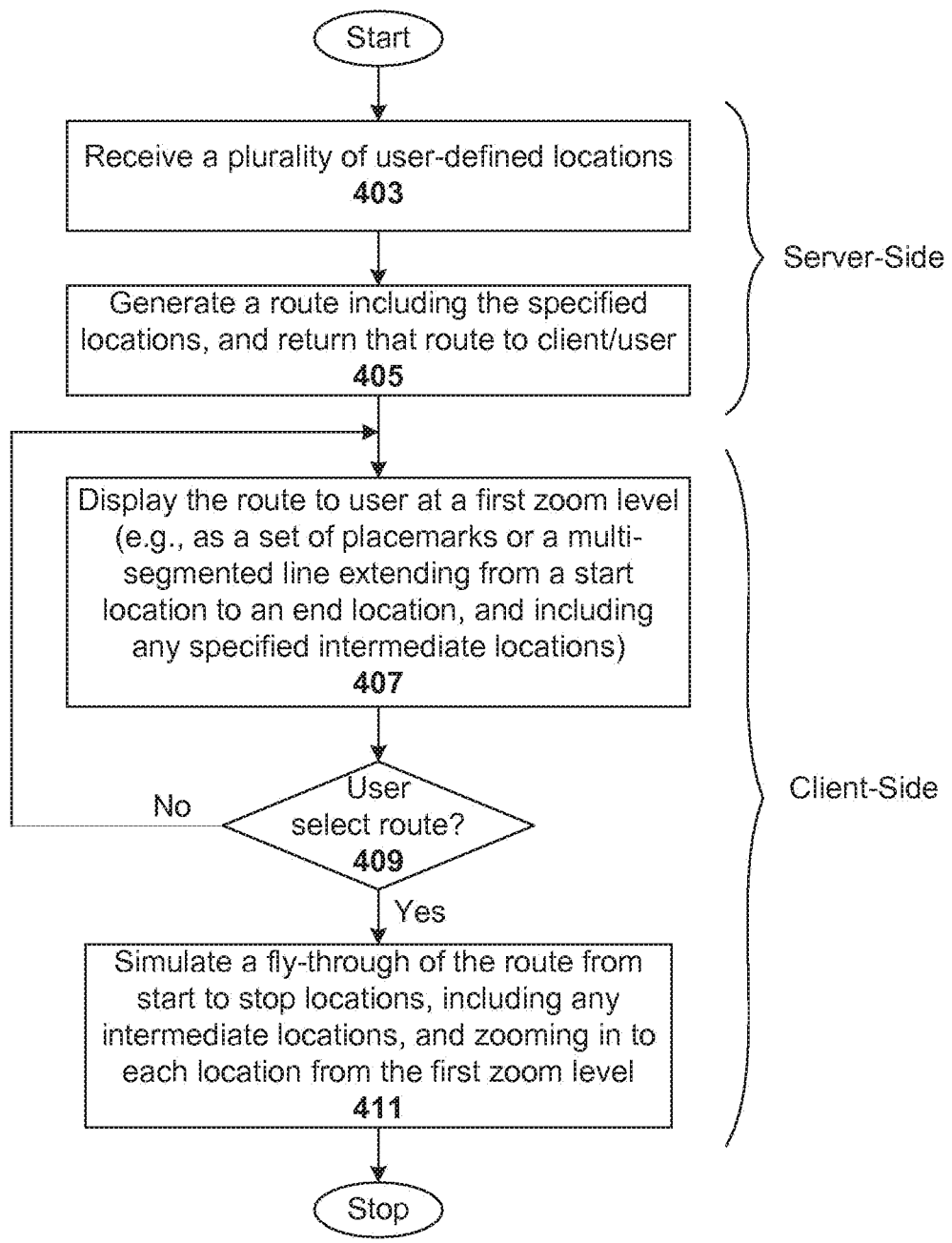
FIG. 4 illustrates a method for presenting virtual tours of user-defined paths in accordance with an embodiment of the present invention system.

An interactive GIS configured in accordance with an embodiment of the present invention presents this virtual tour of a user-defined path capability through a staged method as shown in FIG. 4. As can be seen, part of the method is carried out by the server-side (e.g., server system 105) and part by the client-side (e.g., mapping module 130) of the interactive GIS. The functionality can be integrated into dedicated modules, and/or into modules discussed with reference to FIG. 2a, as will be apparent in light of this disclosure.

The method begins with receiving 403 a plurality of user-defined locations (e.g., start and stop destinations, or a point of interest set) from a client. These locations can be selected by the user, for example, using check boxes next to the desired locations indicated in the Places panel of the GUI 201a. Alternatively, the GUI 201a can be configured to allow the user to enter a series of locations using one or more text entry fields (e.g., start location field, a plurality of intermediate location fields, and a stop location field). The locations can be arbitrary and the order of selection is insignificant (e.g., either the start or end location may be selected first, and subsequent routing requests may replace one or both of the start or end locations).

Once the locations (also referred to as waypoints) are provided by the user, the method continues with generating 405 a route including the specified locations, and returning that route to client/user. The route can be generated, for example, on a local server, a remote server, or a combination of the two. In one particular embodiment, and with reference to FIG. 1, the locations are provided by the user at a client 125 and then sent to the GIS server system 105 via the geospatial browser 125a and network 120, so that the route can be generated. The generated route is then sent back to the mapping module 130 of the requesting client 125.

The method continues with displaying 407 the route to user at a first zoom level (e.g., zoom level suitable to show entire route on display screen). The display can be, for example, a set of placemarks designating each location, or a multi-segmented path (e.g., a POLY-LINE) extending from a start location to an end location, and including any specified intermediate locations. The displayed line or path may follow roadways, walkways, and public transit paths (e.g., bus and subway lines) selected by routing logic (e.g., included in GIS server system 105), with the user-defined waypoints shown along the way (e.g., using icons or placemarks). The zoom level can be set as needed to show the entire route in the display window. In one particular embodiment, the start location is indicated with a green icon, intermediary locations/waypoints are indicated with an amber icon, and the end point is indicated with a red icon, though these colors and markers are just one example of many choices that could be used.

The method continues with determining 409 if the user has selected the route for preview. The user can indicate this selection, for example, by double-clicking the route in the display window 321, or by selecting the "play" button in the Places panel as previously discussed. If the user has not selected the route, then the method continues to display the overall route, until a new route is selected or the user pans to a new view or some other such change takes place.

Otherwise, if the user has selected the route, the method continues with simulating 411 a fly-through of the route from the start to stop locations, including any specified intermediate locations. This fly-through provides the user with a virtual tour of the specified locations/waypoints. The term "fly-through" is used here to indicate virtual motion along a path or route (whether the path/route is user-defined or otherwise), and is intended to represent all motion types (e.g., flying, driving, walking, running, cycling, motor-biking, etc). The zoom level can be set as necessary during the fly-through. For instance, if a single zoom level is suitable to show all of the waypoints at once (i.e., an overall zoom level) as well as details of each waypoint during the fly-through, then a single zoom level can be used for the whole tour. Likewise, a common zoom level can be used for waypoints that are relatively close together (e.g., from one end of Main Street to the other). Alternatively, the fly-through may include zooming in to each waypoint (e.g., at a close-up zoom level that shows more detail of that waypoint) and momentarily pausing at that zoomed in level to give the user time to visualize the waypoint. After the momentary pause (e.g., 5 to 10 seconds), the fly-through process may then zoom back out to the overall zoom level and fly to the next waypoint, where the zoom in, pause, and zoom out procedure is repeated (and so on, for each waypoint along the user-defined path). The virtual tour can be repeated and/or paused as desired (e.g., using "play," "pause," and "stop" controls of GUI 201a). Once paused at a particular waypoint, the user can further explore that waypoint in a free-style manner by using the keystrokes and/or GUI 201a controls such as zoom, pan, rotate, and tilt. The normal fly-through process will then take over once the tour is un-paused (e.g., user selects the "play" control).

In one particular embodiment, the visual offset from the actual path is designed to show an "over the shoulder view" compared to a human traversing this same path as opposed to a "through the windshield view" that a driver might see. This is to enable greater contextual awareness. Note, however, that users can also select the "through the windshield view" display mode, if so desired. One particular implementation of the "over the shoulder view" mode includes computing a set of virtual camera waypoints based on the given list of points (also described as "path") provided by the user. The virtual camera waypoints are computed such that the orientation of the virtual camera is always forward relative to the path, as opposed to following the path always looking towards north. To accomplish this, the azimuth of the virtual camera is computed at each waypoint based on the direction of the camera path. Recall that computing of waypoints and camera azimuth can be carried out by the server system 105, the mapping module 130, or a combination of the two.

In order to prevent jittering, and in accordance with one particular embodiment, the path is first decimated (e.g., at the GIS server system 105) based on the viewing preferences chosen by the user. The goal is to prevent the final virtual camera path from displaying harsh changes in azimuth that would seem unneeded or visually unappealing. The virtual camera azimuth can then be computed at each point in the decimated control path to force the virtual camera to point forward in the direction of the path. The distance between each waypoint in the computed virtual camera path is taken into account to compute time control points. The goal in one such case is for the virtual camera to travel at the speed specified by the user.

Streaming and Interactive Visualization of Filled Polygon Data

Another embodiment of the present invention is a method for streaming and interactive visualization of filled polygon data. The method can be used, for example, for streaming 2D/3D filled polygon data that have been commonly used for representing protruding (e.g., buildings and bridges) as well as non-protruding (e.g., golf courses and lakes) non-terrain geographic features. After being subjected to a height-based pre-filtering process (only applied to 3D buildings), the input polygon dataset is divided into smaller manageable collections referred to as quads. The geometry in these quads is then simplified to form a set of less complex polygons while minimizing the perceptual loss and providing interactive frame rates on the client software.

Conventional systems that provide 3D buildings download the buildings, typically from a local disk. The 3D buildings are then loaded into an application for processing. The analogy here would be loading an entire encyclopedia into the application.

In accordance with an embodiment of the present invention, the data is streamed incrementally to the mapping module 130 as the user "flies" around, and the GIS server system 105 sends only a small subset of the overall database. By analogy, one example embodiment might load all of the first 100 topics of encyclopedia volume "A," the first paragraphs of the next 400 topics, the first sentence of the next 2000 topics, and only the information on the spine of the next few volumes. As the user moves around within the area/topics, the center of the user's "information oasis" changes. By the time the user gets to the end of "Z" then the mapping module 130 would have just the opposite of the starting configuration. The hierarchy of abstractions and simplifications is referred to herein as "levels of detail." These levels of detail are computed in the data processing system (e.g., of GIS server system 105) in advance, so that later, the server system 105 can stream a small and steady amount of information to millions of client 125 applications so that each one can reconstruct just the nearby buildings based on their particular view specification 203a (e.g., position, orientation, etc.) and on the available power of their computer system (e.g., low power notebook, powerful notebook, deskside, gamer's deskside).

Figure 5:
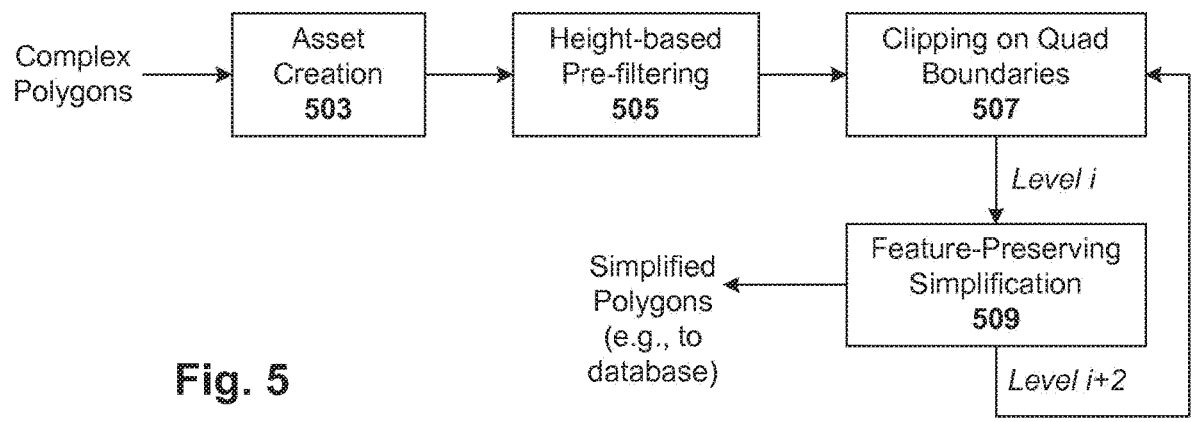
FIG. 5 illustrates a process pipeline for carrying out a method for streaming and interactive visualization of filled polygon data, in accordance with one embodiment of the present invention.

FIG. 5 illustrates the process pipeline for carrying out a method for streaming and interactive visualization of filled polygon data, in accordance with one embodiment of the present invention. As can be seen, the method includes a number of stages by which complex polygon data is converted to simplified polygon data. The stages includes asset creation 503, height-based pre-filtering 505, clipping on quad boundaries 507, and feature-preserving simplification 509. Each of these stages or modules can be implemented, for example, as a set of executable instructions running on the GIS server system 105.

Asset Creation 503: Before applying any algorithm to the complex polygon dataset, that dataset is ingested into the system by creating a vector asset. This process creates an optimized representation of the complex polygon source data inside of the interactive GIS. Asset creation can be carried out using conventional techniques for integrating a data set into a system for subsequent processing.

Height-based Pre-filtering 505: The building datasets are subjected to an additional height-based pre-filtering process. Building polygons are first grouped by their relative height (height above the terrain). This is done so as to preserve the skylines for urban cities. Most cities have a very well defined skyline that is visible from a long distance. This skyline is primarily composed of tall buildings. The grouping can be made, for example, based on a predefined scheme that includes a height range for each group (e.g., 10 feet intervals starting at one story buildings and continuing to N story buildings, with the highest floor at 10×N). The shorter the range per group, the greater the height sensitivity provided by the interactive system, and the more accurate the virtual skyline will be.

Figure 6:
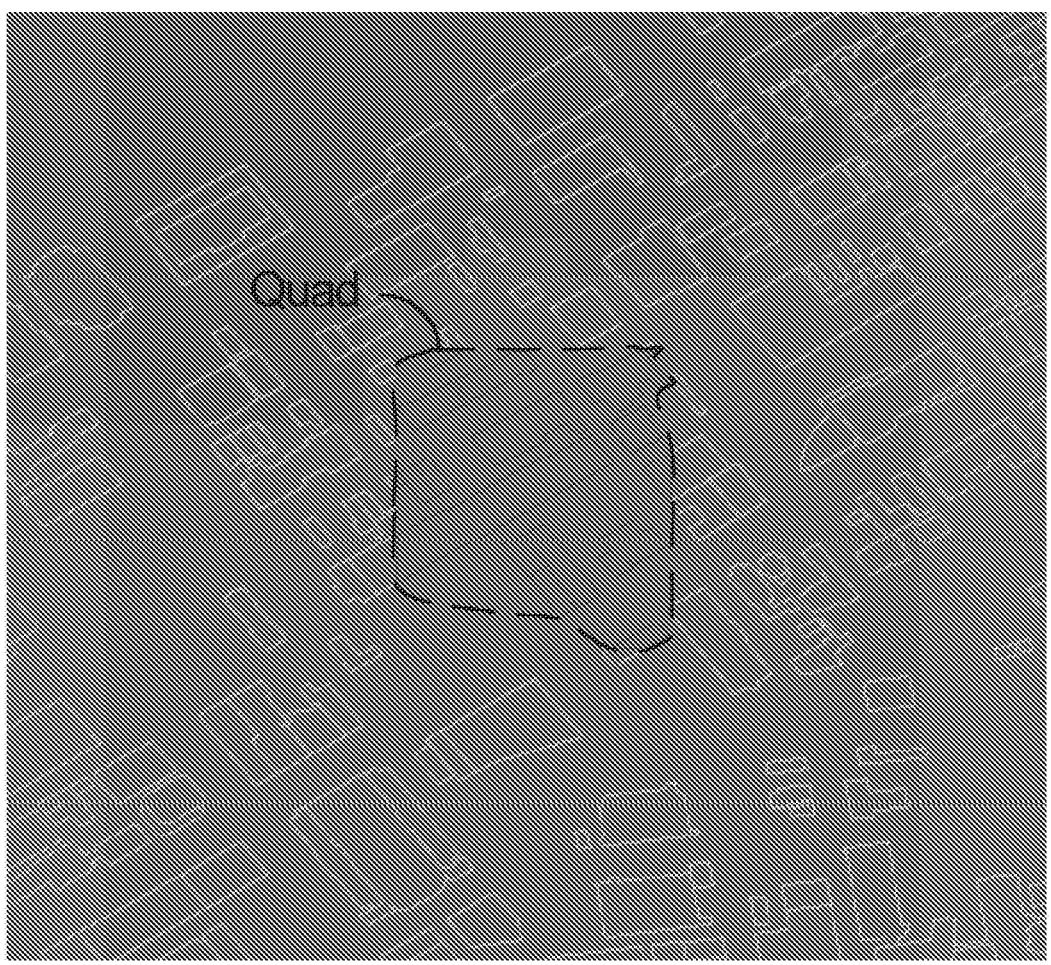
FIG. 6 illustrates a clipping on quad boundary process, in accordance with an embodiment of the present invention system.

Clipping on Quad Boundaries 507: In order to process large amounts of polygon data quickly, the data is indexed spatially and divided into smaller sets. These smaller sets are referred to herein as quads. Each quad is represented by a quad node in the quad node tree 203b as previously discussed. The biggest challenge in dividing the data into quads is avoiding introduction of cracks in the dataset. A certain fraction of polygons fall on quad boundaries and need to be clipped. The clipping process generates additional geometry in the form of newly introduced vertices and edges in the interior of the polygons. These vertices and edges are flagged as being internal. For the actual clipping process, one particular embodiment implements the Liang-Barsky polygon clipping algorithm (although other suitable clipping algorithms can be used) followed by a degenerate edge removal post-process. FIG. 6 visually illustrates this clipping process. Polygons in marked area have been selected as being inside the quad. Note that the dashed border around the polygons is drawn in to designate the quad area for purposes of discussion, and otherwise would not be shown.

Feature-Preserving Simplification 509: This process includes a number of aspects, including elimination of collinear vertices, volume-based simplification of 2.5D polygons (extruded 2D geometry, such as buildings), shape-preserving simplification of 2D polygons, shape-preserving simplification of 3D polygons, and view-dependent simplified sets. Each will now be discussed in turn.

Elimination of collinear vertices—Once the polygons are clipped, they are subject to a decimation process. Typically, vendors introduce large number of collinear vertices (e.g., 20-40%) in their polygon data. These vertices increase the dataset without providing any meaningful information. In accordance with one embodiment of the present invention, the collinear vertices that are contiguous are eliminated by setting a threshold on the amount of angular variation in contiguous line segments defined by these vertices. Additional thresholds can be set for preserving very close and almost collinear vertices that are used to represent curved surfaces.

Volume-based simplification of 2.5D polygons (extruded 2D geometry, such as buildings)—In order to preserve the overall density of the visible buildings while providing interactive visualization at every level i of detail, the overall volume enclosed by the features can be preserved. This gives a good balance between preserving important structures and maintaining a good frame-rate. Polygons are sorted based on the volumes enclosed. Polygons enclosing less volume are eliminated at that level based on a simplification factor that is a function of the level i of detail required. Polygons generated as a result of clipping are not eliminated. This is done so as to make sure that partial buildings at quad boundaries are seen where one quad is rendered at a higher level of detail and the adjacent quad is rendered at a lower level of detail.

Quads that are simplified are re-introduced with the original detail again two levels below (Level i+2). Further simplification is accomplished by aggregating buildings into city blocks. This is done only at lower levels of detail where the features begin to occupy sub-pixel space in the display window 321.

Shape-preserving simplification of 2D polygons—For 2D polygons, the goal is to preserve the shape of the feature. In accordance with one embodiment of the present invention, a simplification here works on a per-polygon basis. Vertices are classified as critical/non-critical based on the angle subtended by the line-segments containing the vertex and also the lengths of the line segments themselves. In order to avoid introducing cracks, vertices at the quad boundaries are not eliminated.

Shape-preserving simplification of 3D polygons—Non-extruded structures such as pyramid-shaped buildings, bridges, etc are usually represented as triangulated irregular networks. One embodiment of the present invention simplifies such datasets by replacing complex triangle meshes with simpler ones, while preserving the shape of the structures. In doing so, the surface curvature of the meshes are taken into account.

View-dependent simplified sets—Server-side simplification cannot take into account the view of the user. Therefore, the server-side algorithms (e.g., of GIS server system 105) cannot perform view-dependent simplification. Thus, in one embodiment, the server system 105 creates simplified sets of geometry based on different camera positions/orientations. At runtime, the mapping module 130 of client 125 can choose the set that best matches the current camera pose.

KML

The interactive GIS described herein supports a number of display features for rich presentation of GIS data. All of the features supported by the GIS can be described in KML. KML, or Keyhole Markup Language, is a hierarchical XML-based grammar and file format for modeling, storing, and displaying geographic features such as points, lines, images, and polygons for display by the client 125. KML controls elements that appear in the 3D viewer (e.g., browser 130a) and the Places pane (e.g., as discussed with reference to FIG. 3a).

In accordance with one particular embodiment, the client 125 downloads one or more KML files from the GIS server system 105 when presenting GIS data. In addition, the client 125 can download KML files from other servers on the network 120. Moreover, an end-user can use the client 125 to create KML files and optionally share the files with the server system 105 and/or other clients 125 via the network 120 and/or other means.

In one embodiment, files containing KML are encoded in a default file format referred to as "KMZ." KMZ is a compressed file format and in one embodiment uses compression based on the common ZIP file formats. Other compression schemes can be used as well. A single KMZ file can contain one or more constituent files that are extracted when the KMZ file is utilized. A benefit of using KMZ is that all of the images and other data utilized to create a particular presentation of GIS data are self-contained within a single file that can be easily shared among the GIS server system 105 and clients 125.

KML can be authored in a number of ways, depending upon the desired purpose. Three particular examples include using a text editor, using a client 125, and using a development environment to generate KML programmatically, each of which will now be discussed in turn.

Use a text editor—A text editor can be used to create KML as a way to create simple file prototypes, or to test out the validity of a particular KML document syntax or structure. For quick KML syntax checking in accordance with one particular embodiment, right-click on a placemark or overlay in the GUI 201a and select Copy from the pop-up menu. Then, open a simple text document and paste the KML contents into it for a quick and easy way to view KML generated by the client 125.

Use client 125 to author data—To create KML for distribution by email or to host as non-dynamic content on a web server, use client 125. In particular, structure the data as desired in the GUI 201a and save it as a separate file (KMZ). This is also a useful way to determine the best structure for more complex KML documents that can be authored programmatically. The client 125 can create and save all but a few KML tags, in accordance with one particular embodiment. Recall that the mapping module 130 on a client 125 may be further configured with a development module that an end-user can use to generate KML and save the KML in a KMZ file, a discussed in more detail in the previously incorporated U.S. application Ser. No. 11/426,831, filed Jun. 27, 2006, titled "Markup Language for an Interactive Geographic Information System".

Use a development environment to generate KML programmatically—Any favored development environment (e.g., php, Java servlets) can be used to author KML content for delivery via the web, much in the same way that other dynamic web content is created. Most content editors that display XML data can do the same for KML.

The following is an example KML file:

```
<kml xmlns="http://earth.google.com/kml/2.0">
<Placemark>
    <description><![CDATA[<a href="http://www.google.com/">Google Search!</a>]]></description>
    <name>Google Headquarters</name>
    <LookAt>
        <longitude>-122.0839</longitude>
        <latitude>37.4219</latitude>
        <range>540.68</range>
        <tilt>0</tilt>
        <heading>3</heading>
    </LookAt>
    <Point>
        <coordinates>-122.0839,37.4219,0</coordinates>
    </Point>
</Placemark>
</kml>
```

In this example, the <kml> element contains a single <Placemark> element named Google Headquarters. When loaded into the client 125, the <Placemark> is displayed as the default icon positioned at the longitude and latitude given by the <coordinates> element. The <LookAt> element of the <Placemark> specifies the "virtual camera" view when displaying the placemark in the 3D viewer (e.g., browser 125a). Note how the <description> text contains HTML tags and a hyperlink. The viewer displays the description and formats it according to the HTML tags and will open clicked hyperlinks in a web browser window (in this example, the Google homepage will open). In accordance with one embodiment of the present invention, this example KML code can be tested by copying and pasting it to a simple text editor and saving it as a file with the extension .kml. Then, drag and drop the file over the 3D viewer of the client 125 to view the results.

In accordance with one particular embodiment of the present invention, KML can be used to:

Specify icons and labels to identify locations on the planet (or other target area) surface.

Create different camera positions to define unique views for each of the displayed features.

Use image overlays attached to the ground or screen.

Define styles to specify feature appearance.

Write HTML descriptions of features—including hyperlinks and embedded images.

Use folders for hierarchical grouping of features.

Dynamically fetch and update KML files from remote or local network locations (Network Link).

Deliver current view details from the client to the server in order to fetch KML data based on changes in the 3D viewer.

A KML file is processed by the client 125 in a similar way that HTML (and XML) files are processed by web browsers. Like HTML, KML has a tag-based structure with names and attributes used for specific display purposes. Thus, the client 125 acts as a browser of KML files.

KML features share a number of common elements: Name, Description, Visibility, View Coordinates, and Snippet, as will now be described.

Name: The KML syntax uses the <name> tag to provide the name of a folder, placemark, overlay, or other features for easy identification in the mapping module 130. The following example shows the <name> element applied to a <Folder> element.

```
<Folder>
    <name>My House</name>
    ...
</Folder>
```

Values of <name> are user-defined, and it can be contained by (i.e., it parent tags): <Folder>, <Document>, <GroundOverlay>, <Placemark>, <ScreenOverlay>, and <Schema>. It has no child tags. The <Schema> element is a complex tag that is used to define a custom schema to enable KML to properly interpret elements in your KML not native to the default KML schema. Using this <Schema> tag and its children, the user can define his own schema as a set of named and typed XML elements. The <Schema> tag has no values and no parent tags, but is parent to the following elements: <name>, <parent>, <ObjField>, <ObjArrayField>, <SimpleField>, and <SimpleArrayField>.

Description: The <description> tag can be used to enter additional information about a feature. This description appears, for example, in the Places panel (of the GUI 201*a* shown in FIG. 3*a*) when the user clicks on a folder or ground overlay, and in a pop-up window when the user clicks on either a Placemark name in the Places panel, or a placemark icon on the map. The description element supports plain text as well as HTML formatting. In one particular embodiment, the mapping module 130 is programmed or otherwise configured to recognize a valid web URL entered in the description, and to automatically convert the URL to a hyperlink to that URL (e.g., http://www.google.com). Consequently, a URL does not need to be surrounded with the <a href="http://.."></a> tags in order to achieve a simple link (thereby minimizing need for HTML markup). However, the appearance of the descriptive text can be formatted using HTML to provide font styling and even images, if so desired. When using HTML to create a hyperlink around a specific word, or when including images in the HTML, entity references or the CDATA element can be used to escape angle brackets and apostrophes. The CDATA element tells the XML parser to ignore special characters used within the brackets. This element takes the form, for example, of: <![CDATA[special characters here]]>. If it is desired not to use the CDATA element, entity references can be used to replace all the special characters. However, it is most often simplest to use the CDATA element to enclose the entire HTML string rather than to substitute entity references for each special character. The following example illustrates the description tag used to generate the pop-up illustrated above:

```
<description><![CDATA[This is an image <img src="C:\Documents and Settings\My Documents\Icons\icon.gif"> and we have a link http://www.google.com.]]></description>
```

Values of the <description> tag are user-defined. It has no child tags, and can be contained by (i.e., its parent tags): <Document>, <Folder>, <NetworkLink>, <GroundOverlay>, <ScreenOverlay>, and <Placemark>.

Visibility: The <visibility> tag can be used to set the default visibility of a feature (e.g., folder, a placemark, or an overlay) when first opened in the mapping module 130. Visibility applies to all features. However, visibility has special conditions when used on features and overlays within folders. A feature is visible if it and its ancestors have their visibility set to true (1). One can define whether or not to initially display the feature when the user opens the KML file. After opening the KML file, the user has the option to toggle the display of the feature on or off. For example:

```
<Placemark>
    <name>The Home Store, Site #3</name>
    <visibility>0</visibility>
    ....
</Placemark>
```

Values for the <visibility> tag are as follows: 0 sets default visibility off, and 1 sets default visibility on. Parent Tags in which the <visibility> tag can be contained: <Folder>, <Document>, <GroundOverlay>, <Placemark>, and <ScreenOverlay>. The <visibility> tag has no child tags.

View coordinates—The <LookAt> element can be used to specify the view around a given point on the planet surface. The mapping module 130 can set the "camera" view for placemarks, folders, overlays, and other features. When a feature has a specified <LookAt> tag, double-clicking the item in the Places window causes the mapping module 130 to pan or tilt to achieve the specified view. Note that the view for a feature bears no relationship to the coordinates or extent (longitude/latitude) of the feature. For example, a placemark might be positioned in the center of a large plot of land, and the observation coordinates for that placemark might look off toward the left corner of the land rather than directly down over the placemark itself. In fact, the view for a placemark can be set so that the geometry itself is not even in view. This behavior can be used to mark a "camera view" of a particular position that is not associated with any geometry; for example, a view of the north rim of the Grand Canyon. A placemark could even be set in California, and the view for that placemark set in New York. When a feature has no <LookAt> tags, double-clicking the feature causes the mapping module 130 to zoom to a view directly over the feature. The <LookAt> tag is a complex tag that defines the observation coordinates or eye point of a parent placemark, folder, or ground overlay. For example:

```
<LookAt>
    <heading>-0.00895499</heading>
    <tilt>39.4365</tilt>
    <range>214.17</range>
    <latitude>37.3895</latitude>
    <longitude>-122.086</longitude>
</LookAt>
```

The <LookAt> tag has no values, and can be contained by (i.e., its parent tags)<Folder>, <Document>, <Placemark>, and <GroundOverlay>. It can contain the following (i.e., its child tags): <heading>, <latitude>, <longitude>, <tilt> and <range>. The <heading> tag describes the angular distance along the horizon to a viewpoint. This is measured from north. The following example shows a heading due west: <heading>-90</heading>. In one particular embodiment, its values are defined with respect to the observation coordinates (with the value expressed in decimal degrees). It has no child tags. The <latitude> tag defines the distance on the Earth or other target area (e.g., measured in degrees) north or south of the equator (e.g., <latitude>33.3205</latitude>). Its values can also be determined by the observation coordinates of the particular view (with its units expressed in decimal degrees). It has no child tags. The <longitude> tag defines the distance on the Earth or other target area (e.g., measured in degrees) east (positive values above 0 to 180 degrees) or west (negative values below 0 to 180 degrees) of the Greenwich Meridian (e.g., <longitude>-111.965</longitude>). Its values can also be determined by the observation coordinates of the particular view (with its units expressed in decimal degrees). It has no child tags. The <tilt> tag indicates the angle of the eyepoint to the designated point and ranges from 0 to 90. A value of 0 indicates no tilt and the perspective of looking straight down on the object. A value of 90 indicates full tilt and the perspective of a horizon view. The <range> tag determines the distance (e.g., in meters) from the surface (sea level) of the planet at longitude/latitude to the eye point (e.g., <range>909.907</range>). Its values can also be determined by the observation coordinates of the particular view (with its units expressed in decimal degrees). It has no child tags. Note that decimal degrees, meters, etc are used for example embodiments herein, but any standard or other suitable GIS notation can be used, as will be appreciated in light of this disclosure.

Snippet—Use the <Snippet> tag to provide a brief description that appears beneath the feature when that feature is displayed in the Places panel (of GUI 201a of FIG. 3a). This tag can be used to create a brief description when it is desired to override the appearance of the <description> element's content in the Places panel. If a placemark contains both a description and a snippet, the snippet appears beneath the placemark in the Places panel, and a description appears in the description balloon. For example:

```
<Placemark>
    <name>Google Earth - New Placemark</name>
    <description>Some Descriptive text.</description>
    <Snippet>Here is some snippet in bold</snippet>
    <LookAt id="khLookAt780">
        <longitude>-90.86879847669974</longitude>
        <latitude>48.25330383601299</latitude>
        <range>440.8490922646644</range>
        <tilt>8.39474026454335</tilt>
        <heading>2.701112047774894</heading>
    </LookAt>
    <styleUrl>#khStyle721</styleUrl>
    <Point id="khPoint781">
        <coordinates>-90.86948943473118,48.25450093195546,0</coordinates>
    </Point>
</Placemark>
```

Values of the <Snippet> tag are user-defined text. Its parent is <Placemark>, and it has no child tags.

Network Link Mechanism

A powerful KML feature is the network link. Network links can be used to quickly and easily share KML files among multiple users by sharing a link to the data rather than distributing the data itself. A network link can be thought of as a folder that has attributes that you can define and then place on a server (either a local area network server, an Internet web server, or on the local file system). This enables users to easily obtain dynamic data contained in the network link. For example, a user can collect a number of weather satellite imagery overlays, along with other data that is polled from other servers (e.g., multiple network links, where one network link can refer to another network link, and so on, to poll data from multiple sources), and bundle all the information together in a network link that people can open to view weather forecast models superimposed on the earth (or other target area). Network links can use all common elements as well as most of the features available to folders.

A "network link" of the interactive GIS described herein can be used to allow sharing of geospatial information across a network with automatic update and spatial query functions. In one embodiment, it includes a timer specification for refresh frequency and the ability for the data to be refreshed at some time period after the user has stopped moving.

One particular configuration in which the network link can operate includes: a geospatial browser (2D or 3D) client software running on a client machine (e.g., such as mapping module 130 and browser 125a running on client 125), and a server hosting a geospatial description file (e.g., such as third-party content server 140 and the geospatial description file 140a) containing coordinates and label/icon/description information (alternatively, a local description file can be referenced if some other process is updating the information). In one such particular configuration, a 3D geospatial browser supporting the "KML" geospatial markup language is used, and a server (e.g., such as one included in server system 105) hosting one or more changing KML files or a spatial database that returns KML based on a query string and a bounding box for the current view.

As previously explained, KML is an XML schema for defining geospatial markup. Main elements of one embodiment include: folders, placemarks (geospatially located icons with labels and an associated description), lines, polygons, image overlays (geospatially oriented images overlayed on top of a base map), screen overlays (screen-aligned images, not geospatially oriented), and network links. Further details of KML are provided, for example, in the KML specification included in Appendix A of the previously incorporated U.S. Provisional Application No. 60/694,529, as well as in the previously incorporated U.S. application Ser. No. 11/426,831, filed Jun. 27, 2006, titled "Markup Language for an Interactive Geographic Information System". Network links are defined by KML so they can be shared among users, and a network link can load a KML file that has additional network links contained within it. KML also defines numerous other features of an interactive GIS configured in accordance with embodiments of the present invention, as will be apparent in light of this disclosure.

The implementation of a network link can be time-based or view-based. In time-based, the network link specifies how frequently to update the file (e.g., once at startup of the application, and manually refreshed, every n seconds). When the mapping module 130 of client 125 sees the timer go off (or gets a manual/startup refresh request), it re-loads the geospatial description file given its URL (e.g., either on remote servers, such as "http:// . . . ", or on local networks such as "\\myServer\ . . . .", or any other valid network location). The KML items contained within the file replace the previous items shown inside the network link folder. The items visibility can be specified by the KML in the file or the user's choice of visibility in the user interface.

In view-based, an additional choice for refresh can be implemented (e.g., where the refresh takes place every n seconds after the user has stopped moving the view). This additional feature allows a network link to provide the results of a spatial query to simulate a "layer" of information where only the data in the current view needs to be shown. The bounding-box of the current view is appended to the URL (or otherwise sent) so that the server system 105 knows what geospatial location the requested data needs to be pulled from. In accordance with one embodiment of the present invention, the view-based network link enables a dynamic search mechanism for distributed geospatial information system, as will be described in turn with reference to FIG. 8. Note that the bounding-box of the current view can be sent back on any network link, not just view-based-refresh network links, as will be apparent in light of this disclosure.

Figure 7A:
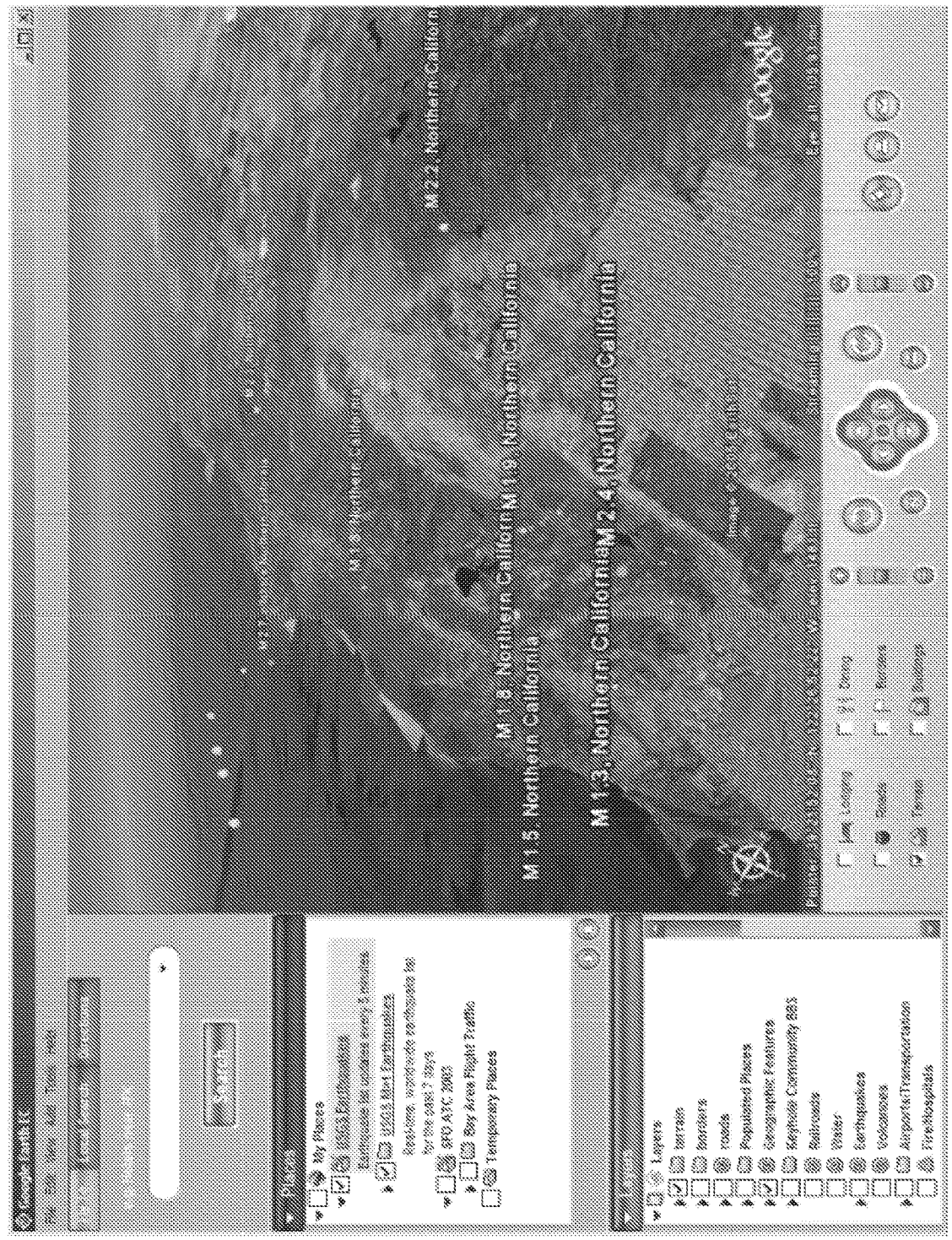
FIG. 7a illustrates an example screenshot showing a network link feed from the USGS earthquake monitors.
Figure 7B:
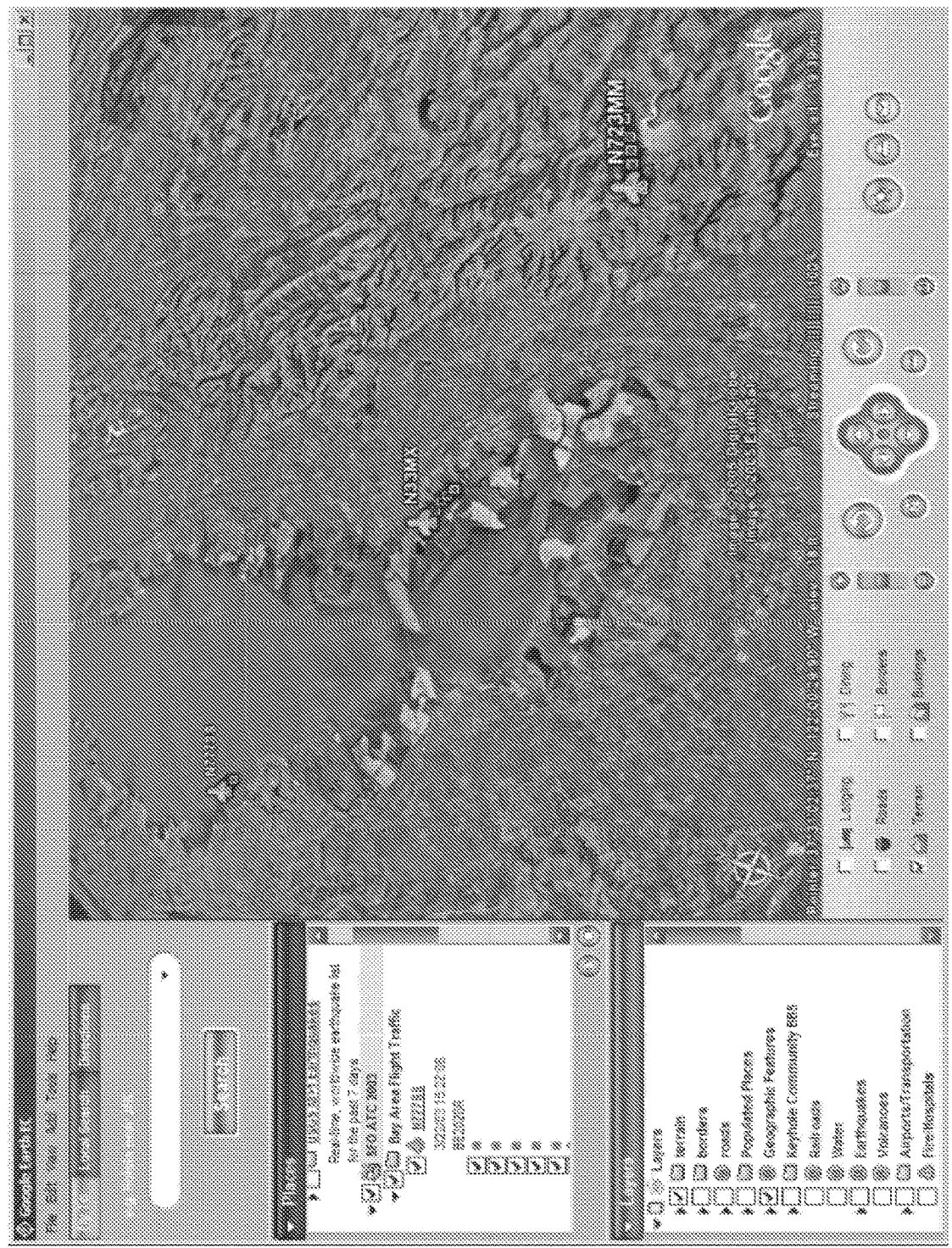
FIG. 7b illustrates an example screenshot showing a network link feed for historical flight path data for aircraft on approach to SFO.

A serial number can be attached to each KML item so that when refreshes occur, existing items can receive modifications without the delete/replace cycle/cost. Network links could also be implemented as an RSS feed, as will be apparent in light of this disclosure. FIG. 7a illustrates an example screenshot showing a network link feed from the USGS earthquake monitors, and FIG. 7b illustrates an example screenshot showing a network link feed for historical flight path data for aircraft on approach to SFO.

Figure 7C:
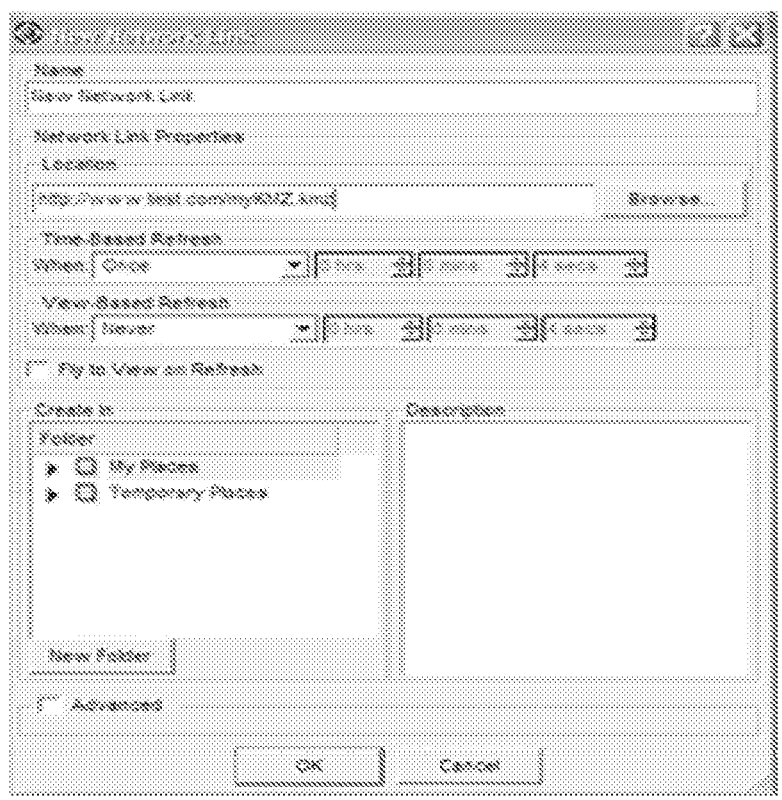
FIG. 7c illustrates an example dialog box used for creating a new network link, in accordance with one embodiment of the present invention.

Before creating a network link, the target content to which it is desired to link must exist on a network or web server to which can be linked. If the user is authoring the content, then the content can be saved to a network or web server. In any case, the network location of the file, or the URL if it is located on a web server, must be known. To create a network link, the user can, for example, select "network link" from the Add menu of the main menus 325, or click the add network link control 317, or right-click on a folder in the My Places Panel. In one such embodiment of the present invention, the user interaction module 201 is programmed to respond to such user actions by opening a new network link dialog box, such as the one shown in FIG. 7c. The user can then enter the name of the link in the Name field. Likewise, the user can enter the full path of the corresponding KMZ file (or other suitable file format) in the URL or Filename text box. Alternatively, the user can browse to the desired file location if the file is located on a network. In the example shown in FIG. 7c, a URL is used to reference a KMZ file (http://www.test.com/myKMZ.kmz). In one particular configuration, the 3D viewer (geospatial browser 125a) immediately flies to the default view for the linked data. The user can further set the desired refresh rate. In this particular example, Time-based Refresh indicates how often the client 125 refreshes checked items in the network link, and includes two options: Once (where each time the mapping module 130 is started, it updates any checked items in the network link folder), or Periodically (where the mapping module 130 updates checked items based on the time frequency set by the user in hours, minutes, and seconds. The user can also set the desired fetch rate for view-based data. View-Based Refresh is an advanced feature that is meaningful if the user is connecting to data that displays content depending upon the viewing coordinates of the mapping module 130. For example, assume the link is to a server that supplies thousands of real estate listings for an entire state, but will deliver only the listings pertinent to the area encompassed in the 3D viewer. Here, the fetch rate can be set for view-based data depending upon the behavior desired in the 3D viewer. The choices that can be selected for a View-Based Refresh include: Never, On Request, and After Camera Stops. When Never is selected, this feature is left off for data independent of camera view, such as a static overlay image. When On Request is selected, camera-based data is manually updated by right-clicking on the network link folder and selecting Refresh from the pop-up menu. When After Camera Stops is selected, camera-based data is updated after movement in the viewer stops (a delay of N seconds after a stop may be specified, so that only view changes that remain unchanged for the specified delay period trigger a refresh). This prevents the mapping module 130 from fetching server updates while the user is moving the viewer, which slows performance. Once the user is finished navigating to a new location, data is refreshed at the set interval. For example, the time period is set to 1 second, the server data is fetched every second once movement in the viewer stops. When the user begins navigating again, server data fetching is halted. The user can also enter descriptive text or HTML. This data can be entered, for example, in the same way data would be entered for a regular folder. The text the user enters in this description is the description of the link only, and is not viewable by anyone else linking to the KMZ file. Only the user will be able to see the description entered here (unless the user emails the link folder to other people). In one such embodiment, this is similar to creating a bookmark for a web page and then adding a descriptive note about the bookmark. The user can also set advanced information, if desired. Two example advanced options available in the Advanced section include View and Style. With the View option, the user can set the view for the top-level linked folder as done for any folder. With the Style option, style information is available when the items within the linked KMZ file are all of the same type, such as all placemarks, or all overlays. If there are a mixture of items within the linked folder, no style information is available. However, once the user links the top-level folder, information in any child folder can be edited and style information can be set for it, if available.

Thus, a network link can be used to quickly and easily share geospatial information (such as KML files, as will be explained in turn) among multiple users across a network by sharing a link to the data rather than distributing the data itself. A network link configured in accordance with one embodiment of the present invention has the following KML features: Name, Visibility, and URL. Other related features include Folders, Documents, Ground Overlays, Placemarks, and Screen Overlays. Each of these KML features, and others, will be discussed in turn. Other support KML features will be apparent in light of this disclosure, and are further described in the previously incorporated U.S. Provisional Application No. 60/694,529 and U.S. application Ser. No. 11/426,831.

KML Features

The <NetworkLink> is a complex tag used to define a referenced KML file on a local or remote network. For example:

```
<NetworkLink>
    <refreshVisibility>0</refreshVisibility>
    <refreshInterval>121</refreshInterval>
    <Url>
        <href>//myServer/Googleearth/example.kmlM.</href>
    </Url>
    <visibility>1</visibility>
    <name>TestNetworkLink</name>
</NetworkLink>
```

There are no values for the <NetworkLink>, and its parent tags includes <Folder> and <Document>. Child Tags include <refreshVisibility>, <refreshInterval>, <Url>, <name>, and <visibility>.

Name: as previously discussed.

Visibility: as previously discussed.

URL: Location of the linked KML file (or other script). As previously explained, network links can reference a KML file either on remote servers (http:// . . . ) or on local networks (\\myServer\ . . . ). The URL tag is a parent to several child tags that control various aspects of the link's behavior. These child tags includes: Refresh Interval, Refresh Visibility, Refresh Mode, View Refresh Mode, and View Refresh Time, each of which will now be described.

Refresh Interval—The <refreshInterval> is a tag used to indicate the period of time to refresh the linked data or overlay (e.g., in seconds). In one particular embodiment, if the value is greater than 0, the URL is refreshed every n seconds. If the value is less than 0, the URL will never be loaded, and if the value is equal to 0, the URL is loaded once. For example:

```
<NetworkLink>
    <refreshVisibility>0</refreshVisibility>
    <refreshInterval>121</refreshInterval>
    <<Url>>//myServer/GoogleEarth/example.kml</Url>>
    <visibility>1</visibility>
    <name>TestNetworkLink</name>
</NetworkLink>
```

Values for the <refreshInterval> tag are indicated in seconds. If the value is greater than 0, the image or URL is refreshed every n seconds. If the value is less then 0, the image will never be loaded, and if the value is equal to 0, the image is loaded once. Parent Tags in which the <refreshInterval> tag can be contained: <NetworkLink>, <GroundOverlay>, and <ScreenOverlay>. The <refreshInterval> tag has no child tags.

Refresh Visibility—The <refreshVisibility> tag can be used to maintain or ignore the default visibility of features within the KML document to which the network link points. In one particular embodiment, values for the <refreshVisibility> tag are as follows: default value is 0, leaves the visibility within the control of the mapping module 130; set the value to 1 to reset the visibility of features each time the network link is refreshed. For example, suppose an item in the linked KML file has a visibility set to 0 and refresh visibility is on (set to 1). When the file is first loaded into the mapping module 130, the check box next to the item is cleared and the item is not visible in the display window 321 of the 3D browser/viewer. If the user selects the item's check box (e.g., such as the check box shown in the Places panel of FIG. 3a) to make it visible in the display window 321 of the 3D browser/viewer, the item will again be cleared once the URL is refreshed. Parent Tags in which the <refreshVisibility> tag can be contained: <NetworkLink>. The <refreshVisibility> tag has no child tags.

Refresh Mode—Network Links can be loaded dynamically in one of three ways: on user request, once on document load, or periodically according to the value of the refresh interval. The <refreshMode> tag sets the type of refresh that is done to a network link or ground overlay, either refreshing upon a designated interval or only once upon loading in the client 125. For example

```
<Url>
<href>http://www.example.com/geotiff/NE/MergedReflectivityQComposite.kml</href>
    <refreshMode>onInterval</refreshMode>
    <refreshInterval>30</refreshInterval>
    <viewRefreshMode>onStop</viewRefreshMode>
    <viewRefreshTime>7</viewRefreshTime>
    <ViewFormat>BBOX=[bboxWest],[bboxSouth],[bboxEast],[bboxNorth],
[lookatLon],[lookatLat],[lookatRange],[lookatTilt],[lookatHeading]</viewFormat>
    </Url>
        . . .
    <Icon>
```

```
<href>http://wdssii.nssl.noaa.gov/geotiff/NW/MergedReflectivityQComposite_20051005
-231649.tif?</href>
    <refreshMode>onInterval</refreshMode>
     <viewRefreshMode>onRequest</viewRefreshMode>
</Icon>
```

With regard to values, onInterval can be used to indicate a time-based refresh of the KML or the ground overlay. Use once or leave the tag out to indicate refresh only upon loading of the network link or overlay into the client 125. The <refreshMode> tag can be contained by <Icon> and <Url>, and has no child tags.

bounding-box coordinates. With the <ViewFormat> tag, the user can return any of these parameters in whichever order, and also a number of parameters in the <LookAt> element. The following example returns all possible information in a comma-delimited string:

```
<NetworkLink>
     <name>NE US Radar</name>
     <flyToView>1</flyToView>
     <Url>
<href>http://www.example.com/geotiff/NE/MergedReflectivityQComposite.kml</href>
          <refreshMode>onInterval</refreshMode>
          <refreshInterval>30</refreshInterval>
          <viewRefreshMode>onStop</viewRefreshMode>
          <viewRefreshTime>7</viewRefreshTime>
          <ViewFormat>BBOX=[bboxWest],[bboxSouth],[bboxEast],[bboxNorth],
[lookatLon],[lookatLat],[lookatRange],[lookatTilt],[lookatHeading]</viewFormat>
     </Url>
</NetworkLink>
```

View Refresh Mode—A view-based query can be returned to the server system 105 either periodically, according to the view refresh interval, or after a set time has elapsed since the "virtual camera" has stopped moving. When active, the mapping module 130 sends an HTTP GET to the source server system 105 with the coordinates of the view window (e.g., display window 321 of FIG. 3*a*) appended as a BBOX value. In this way, the source server system 105 may then return information in the context of the active view. The <viewRefreshMode> tag specifies when the mapping module 130/client 125 should return the view coordinates to the <href> server (of server system 105). In one particular embodiment, values of the <viewRefreshMode> are as follows: onStop will return the coordinates n seconds after movement in the viewing window has stopped, where n is defined in <viewRefreshTime>. Parent tags in which the <viewRefreshMode> tag can be contained: <Url>. The <viewRefreshMode> tag has no child tags. The <href> tag, which is a child of the <Url> element and has no child tags, defines the location of an object such as a network link or the image to be used as an overlay or icon for a placemark (this location can either be on a local file system or a remote web server). In one particular embodiment, parameters of the BBOX are programmable via a <ViewFormat> tag, which provides substantial flexibility and allows compatibility with other existing web services (e.g., Web Mapping Service, or WMS). The <ViewFormat> element can be used to select what view information the mapping module 130 sends to the server 110 in a query, and allows the user to specify how the mapping module 130 formats the query. The <ViewFormat> tag is a child of the Network Link's<Url>, and has no child tags. In one particular embodiment, if this tag is not specified, the information returned is the WMS-style east, south, west, north Values are user defined, and in one embodiment include the following parameters: [bboxWest], [bboxSouth], [bboxEast], [bboxNorth], [lookatLon], [lookatRange], [lookatTilt], and [lookatHeading]. The </flyToView> tag is a child of <NetworkLink> and <NetworkLinkControl>, and has no child tags. When set, updated KML (or other script) from the $3^{rd}$ party content server causes the viewer to update to the current view. This tag can be used for such situations as alerts or notifications where the current 3D view in the client is effectively overridden, or in situation where two or more users wish to share each other's links (e.g., virtual rendezvous). Its values are Boolean (e.g., 0 for off, 1 for on). The default value is off if the tag is not specified. In a virtual rendezvous, there is a "lead" client/user and at least one "follower" client/user. The <flyToView> tag operates as a client-side configuration that directs the follower client to fly to whatever the results the lead client is viewing. The $3^{rd}$ party server being accessed by the lead is generally referred to herein as a rendezvous server. A user wishing to follow the lead of another person exploring the area covered by GIS can enable this feature, for example, by checking a UI checkbox for that particular lead-follow network link (and can disable that link by unchecking). In an alert/notification application, the <flyToView> tag is a child of <NetworkLinkControl> and is returned as part of the contents. This means the $3^{rd}$ party content server can optionally tell the client to fly to a location (e.g., for alerts or important notifications). The network link fires periodically (e.g., every minute), but most of the time nothing important is returned, so the user's view remains under his control, but in a serious situation, the $3^{rd}$ party content server sets this <flyToView> tag and the client is forced to (at least start to) fly there. An example use of the <flyToView> tag is as follows:

```xml
<?xml version="1.0" encoding="UTF-8"?>
<kml xmlns="http://earth.google.com/kml/2.0">
<NetworkLink>
    <name>NE US Radar</name>
    <flyToView>1</flyToView>
    <Url>
<href>http://www.example.com/geotiff/NE/MergedReflectivityQComposite.kml</href>
        <refreshMode>onInterval</refreshMode>
        <refreshInterval>30</refreshInterval>
        <viewRefreshMode>onStop</viewRefreshMode>
        <viewRefreshTime>7</viewRefreshTime>
        <ViewFormat>BBOX=[bboxWest],[bboxSouth],[bboxEast],[bboxNorth],
        [lookatLon],[lookatLat],[lookatRange],[lookatTilt],[lookatHeading]</viewFormat>
    </Url>
</NetworkLink>
</kml>
```

The <NetworkLinkControl> tag, which has no values and is a child of <Document>, controls the behavior of files fetched via <NetworkLink>. Using this feature, the user can access a number of features via its children, including the <flyToView> tag as previously discussed. Other children include, <minRefreshPeriod>, <message>, <cookie>, <linkDescription>, and <linkName>. The <minRefreshPeriod> element can be used as a server throttle to limit the number of fetches to the $3^{rd}$ party content server to a specified minimum period. For example, if a user sets a link refresh to 5 seconds, the minimum refresh period can be set to 3600 to limit refresh updates to every hour. A<message> enables pop-up messages, such as usages guidelines for a network link can be delivered via the <NetworkLinkControl> tag. In one particular embodiment, the message appears only once each time the network link is loaded into the client, or if the message text is updated on the server. The <cookie> element can be used to append the text to the URL query on the next refresh of the network link. This can be used, for example, in the script to provide more intelligent handling on the server-side, including version querying and conditional file delivery. The <linkName> and <linkDescription> of the network link can also be controlled from the server, so that changes made to the name and description on the client-side can be over-ridden by the server. Example use of <NetworkLinkControl> is as follows:

Visibility—A switch (0 or 1) that controls whether or not the contents of the folder will be visible in the viewing window when the folder is loaded.

Open—A switch (0 or 1) that controls whether or not the folder will be in an expanded or collapsed state when it is loaded.

LookAt—By setting a virtual camera view for a folder, a consistent display can be provided for all the features within the folder, regardless of the camera view set for the individual features. For example, assume different views are specified for a collection of placemarks to highlight characteristics of each placemark. However, with a double-click on the parent folder, the view can shift to one designed to best display all placemarks as a collected group. In one embodiment, if there is no LookAt specified for a particular folder, double-clicking the parent folder will fly to the superset bounding box of the children of that folder.

Logical containment of related data, and folder nesting—a folder can be used to contain related placemarks, overlays, and other folders. By providing folders with a name and LookAt values, information can be grouped in way to make it easily identifiable and manageable. For example, a folder can be used to associate a placemark with a related overlay image file for a multi-layered view of a particular region.

```xml
<NetworkLinkControl>
    <message>This is a pop-up message. You will only see this once</message>
    <cookie>someCookieText</cookie>
    <linkName>New KML features</linkName>
    <linkDescription><![CDATA[KML now has new features
available!]]></linkDescription>
</NetworkLinkControl>
```

View Refresh Time—The <viewRefreshTime> tag specifies the frequency with which to return the view coordinates to the server system 105. Value of the <viewRefreshTime> tag is an integer representing seconds. Parent tags in which the <viewRefreshMode> tag can be contained: <Url>. The <viewRefreshMode> tag has no child tags.

Folders: Most uses of KML employ folders to organize placemarks, screen and ground overlays, and other folders. Folders can be used to quickly identify placemark and overlay groups, to provide a unified view for a group of placemarks and/or overlays. Folders offer a number of elements, and in one particular embodiment include the following:

Name and Description—Each folder can have its own name and description attributes.

Also, a hierarchical structure can be created in a manner similar to the Microsoft Windows folder view, so that folders can be expanded or collapsed to reveal or hide content as needed. The mapping module 130 can be programmed or otherwise configured to allow a user to drag and drop folders on top of other folders in order to nest them. In KML, <Folder></Folder> tags nest within each other, in the same way that <table></table> tags can be nested in HTML.

The <Folder> is a complex, top-level, optional tag used to structure hierarchical arrangement of other folders, placemarks, ground overlays, and screen overlays. This tag is can be used to structure and organize information in the mapping module 130. For example:

```
<Folder>
    <name>Name of Folder</name>
    <description>Descriptive text</description>
    <Folder>
        <name>SubFolder #1 Name</name>
        <description>Descriptive text</description>
        <Placemark>
            [placemark data here ...]
        </Placemark>
    </Folder>
    <Folder>
        <name>SubFolder #2 Name</name>
        <description>Descriptive text</description>
        <Placemark>
            [placemark data here ...]
        </Placemark>
    </Folder>
</Folder>
```

The <Folder> tag has no values, and can be contained by the following (i.e., its parent tags): <Document>, <Folder>, and <NetworkLink>. The <Folder> tag can contain the following tags (i.e., its child tags): <Folder>, <name>, <description>, <LookAt>, <visibility>, <Placemark>, <GroundOverlay>, <ScreenOverlay>, <NetworkLink>, and <Document>.

Documents: A document is a type of folder that can also contain the <Styles> and <Schemas> tags in addition to features such as placemarks, overlays and folders. Documents can be used to group styles and schemas for a collection. Documents are also often root-level containers of KML hierarchies. When styles or schema are needed for data, the <Document> element can be used to contain these other elements. Styles can be used to add custom icons and color and/or size information to geometry. Schemas can be used when a data collection contains features that are not native to KML. With schemas, a feature and its associated meta-data can be defined so that it is correctly displayed in the mapping module 130. As a root level element for KML documents, the <Document> tag acts as a folder for the elements it contains. As explained above, this tag can be used if a KML file requires schemas or styles; otherwise, it is not required. For example:

```
<Document>
    <Style id="my_style">
        <Icon>./images/my_image.png</Icon>
    </Style>
    ....
</Document>
```

The <Document> tag has no values and no parent tags. Its child tags include <Folder>, <name>, <description>, <LookAt>, <visibility>, <Placemark>, <GroundOverlay>, <ScreenOverlay>, <NetworkLink>, and <Document>.

Placemarks: Placemarks are the primary means of marking a point on the earth (or other mapped area). A placemark typically has an icon associated with it that marks a point on the target surface such as the Earth; however, a placemark can also be associated with a path, a polygon and/or a 3D shape. The <Placemark> tag is a complex tag used to describe a placemark. Coordinates can be specified as [longitude, latitude, altitude] where: longitude is between −180 and 180; latitude is between −90 and 90; and altitude is in meters from the surface of the spheroid (WGS84, World Geodetic System 1984) which represents the planet (this is roughly sea level; locations below the surface are automatically displaced onto the surface). In addition, a number of other elements can be defined for placemark entries, including observation coordinates, name, and description. For example:

```
<Placemark>
    <name>Queen Creek</name>
    <LookAt>
        <longitude>-111.634</longitude>
        <latitude>33.2407</latitude>
        <range>5571.15</range>
        <tilt>-0.0129749</tilt>
        <heading>-0.0651017</heading>
    </LookAt>
    <visibility>1</visibility>
    <StyleUrl>root://styleMaps#default?iconId=0x300</StyleUrl>
    <Point>
        <coordinates>-111.634,33.2486,413.037</coordinates>
    </Point>
</Placemark>
```

The <placemark> tag has no values, and can be contained by (i.e., its parents)<Folder> and <Document>. It can contain the following tags and their children, where applicable: <description>, <LookAt>, <LineString>, <Multigeometry>, <name>, <Point>, <StyleUrl>, <Style>, and <visibility>. The <LineString> tag defines a line using a string of coordinates. The <Multigeometry> tag is utilized to group more than one geometry element, such as multiple polygons used to define a single feature. The <Point> tag defines the geographic location of a point coordinate. With KML, the style of a placemark can be customized in a variety of ways. The <style> tag specifies styles for placemarks. In addition, the <StyleUrl> tag can be used to reference an externally-defined style. In one embodiment, the <Document> tag can include a <StyleMap> tag with a value that specifies normal and highlighted icons for a placemark, so that the highlight version appears when the cursor moves over the icon. Through the use of these tags, the creator of a KML file can ensure that the presentation of a placemark described by the file will render the same way across all of the clients 125. Through the use of the <style> tag, a KML file can define the appearance of icon, label, line, polygon, and descriptive balloon elements in the viewer. Styles in one embodiment of KML can either be defined locally within the element being affected, or referenced by an ID and reused among many elements. In many cases, it is more efficient to design classes of styles up front and refer to them as needed, using local styles sparingly for one-off effects. Additional style details are provided in the previously incorporated U.S. Provisional Application No. 60/694,529, as well as in the previously incorporated U.S. application Ser. No. 11/426,831, filed Jun. 27, 2006, titled "Markup Language for an Interactive Geographic Information System".

Image Overlays: Image overlays can be described in KML for adding image-based meta-data to your GIS data in the Google Earth client. There are two types of overlays: Ground overlays and Screen overlays.

Ground overlays are used for information-rich site display such as phased plans or weather maps. Ground overlays are images that are fixed to the planet surface. <GroundOverlay> is complex tag that contains tags for defining and placing an overlay image on the globe (or other mapped area). For example:

```
<GroundOverlay>
    <visibility>0</visibility>
    <Icon>
```

```
        <href>C:/GoogleEarth/example.jpg</href>
    </Icon>
    <drawOrder>0</drawOrder>
    <LatLonBox>
        <rotation>36.9994</rotation>
        <north>39.3082</north>
        <south>38.5209</south>
        <east>-95.1583</east>
        <west>-96.3874</west>
    </LatLonBox>
</GroundOverlay>
```

The <GroundOverlay> tag has no values, and can be contained by any abstract folder. It can contain the following (i.e., its child tags): <drawOrder>, <Icon> (required), <LatLonBox> (required), <visibility>, and <rotation>.

A screen overlay is a "floating" image independent of the position of the viewer and is fixed to the screen. <ScreenOverlay> is a complex tag that contains tags for defining and placing an overlay image on the screen. Example KML code for placing an image (with original width, height and aspect ratio) at the exact center of the screen looks as follows:

```
<?xml version="1.0" encoding="UTF-8"?>
<kml xmlns="http://earth.google.com/kml/2.0">
    <ScreenOverlay id="khScreenOverlay756">
        <description>This screen overlay uses fractional positioning to put the image in
            the exact center of the screen</description>
        <name>Simple crosshairs</name>
        <visibility>0</visibility>
        <Icon>
        <href>http://myserver/myimage.jpg</href>
        </Icon>
        <overlayXY x="0.5" y="0.5" xunits="fraction" yunits="fraction"/>
        <screenXY x="0.5" y="0.5" xunits="fraction" yunits="fraction"/>
        <rotationXY x="0.5" y="0.5" xunits="fraction" yunits="fraction"/>
        <size x="0" y="0" xunits="pixels" yunits="pixels"/>
    </ScreenOverlay>
</kml>
```

The <ScreenOverlay> tag has no values, and can be contained by (i.e., its parent tags) <Folder> and <Document>. It can contain the following (i.e., its child tags): <drawOrder>, <Icon> (required), <visibility>, <rotation>, <size>, <screenXY>, and <overlayXY>.

Common Overlay Features: The following features are shared by both ground and screen overlays: Name, Description, Default visibility, Draw Order Location of image file, Rotation, and Refresh Interval (each now discussed in turn).

Name—As previously explained with reference to the <name> tag, an overlay can have a name.

Description—Likewise, an overlay can have a description, as previously explained.

Default visibility—The display of overlays can be toggled so that multiple overlays in a given location can be used with minimal confusion (as previously discussed with reference to the <visibility> tag).

Draw Order—When using overlapping overlays, the <drawOrder> tag can be used to define the overlay stacking order. In this way, for example, overlay images with black boundary edges or masked boundaries can be assigned a lower number than adjacent overlays so as not to obscure useful information. The <drawOrder> tag is a child of <GroundOverlay> and <ScreenOverlay>. The default value is 0. Overlays with a higher draw order values are drawn on top of overlays with lower draw order values. For example: <drawOrder>0</drawOrder>. Values of the <drawOrder> tag range from 0 to 99. The <drawOrder> tag has no child tags.

Location of image file: As previously explained, the <Url> tag references the overlay image file either locally or remotely, such as on a corporate web server. Remote users do not have to have a local copy of an overlay image if the image is supplied remotely. In this way, real-time updates of overlay data, such as weather or development progress of site plans, can be provided. In one particular embodiment, the following image types are supported: JPG, PNG, GIF, and TIFF (other formats will be apparent in light of this disclosure).

Rotation—In one particular embodiment of the present invention, the rotation of the overlay image can be set. The image can be rotated up to 180 degrees in a clockwise (positive) or counter-clockwise (negative) rotation from north. The <rotation> tag is a tag and child of the <ScreenOverlay>, <GroundOverlay>, and <LatLonBox> elements. It can be used to specify the rotational axis of the image from its center point. Values of the <rotation> tag can range from +/−180 degrees to indicate the rotation of the image from 0, which is the default orientation of the image. The <rotation> tag has no child tags.

Refresh Interval—As previously explained, the <refreshInterval> tag indicates the period of time (e.g., in seconds) to refresh the referenced image. This element can be used, for example, for real-time applications such as web cameras where images are updated on a specific frequency. Both ground overlays and screen overlays may be refreshed using the <refreshInterval> tag.

Other Ground Overlay Features: In KML, ground overlay tags can be placed inside any folder or subfolder in a KML document. Ground overlays support the following elements:

<LookAt>—As with placemarks, the observation coordinates for a ground overlay can be set (as previously discussed).

Mapping Coordinates of the Image Overlay Points—Four coordinates set the edges of the overlay. These coordinates set the North-South (latitude), East-West (longitude) positions of the overlay boundaries. In addition, the overlay's rotation, which is about the center of the overlay, can be indicated. In browser/viewer 125*a*, the user can drag and rotate the overlay in order to set the coordinates, or can enter desired values (e.g., by operation of GUI 201*a* of the mapping module 130).

Other Screen Overlay Features: Screen overlays can be used for a consistent display of information regardless of the viewing placement, such as heads up display, co-branding, or other types of dashboard display. As with ground overlays, multiple screen overlays can be defined and associated with a folder. The position can be defined as an absolute coordinate position in the viewer 125*a*, or as a percentage of the viewer 125*a* size. The opacity of a screen overlay can also be set. Screen overlays in accordance with one embodiment of the present invention have one or more of the following additional features:

Screen position—Two mechanisms for screen positioning provide flexibility in different presentation formats. The position of the screen image can be determined using X/Y coordinates either with exact pixels, or as a fraction of the overall screen. The <overlayXY> tag is a simple field and child of the <ScreenOverlay> element; it has no child tags. The <overlayXY> tag defines the coordinate point on the overlay image itself that will be used to map to the screen coordinate. It requires X and Y values, and the units for those values (e.g., either pixels or fraction). For example, <overlayXY x="1" y="1" xunits="fraction" yunits="fraction"/> affects the upper right corner of the image. Used with <screenXY of x="−50" y="0.9" xunits="pixels" yunits="fraction"/>, this measurement places the upper right corner of the image 50 pixels inset from the right edge of the screen and 10% below the top edge of the screen. The x and y components can be specified in one of the following ways: placing an image in the center of the screen:

<overlayXY x="0.5" y="0.5" xunits="fraction" yunits="fraction"/>
<screenXY x="0.5" y="0.5" xunits="fraction" yunits="fraction"/> or placing an image at the top left of the screen:

<overlayXY x="0" y="1" xunits="fraction" yunits="fraction"/>
<screenXY x="0" y="1" xunits="fraction" yunits="fraction"/> or placing an image at the right of the screen:

<overlayXY x="1" y="1" xunits="fraction" yunits="fraction"/>
<screenXY x="1" y="1" xunits="fraction" yunits="fraction"/>.

The <screenXY> tag is a simple field and child of the <ScreenOverlay> element; it has no child tags. The <screenXY> tag defines the coordinate points on the screen itself that the overlay image will be mapped to. For example, a screenXY of (−50, 0.9) with an overlayXY of (1,1) places the upper right corner of the image 50 pixels inset from the right edge of the screen and 10% below the top edge of the screen. The x and y components can be specified in one of the following ways: placing an image in the center of the screen:

<overlayXY x="0.5" y="0.5" xunits="fraction" yunits="fraction"/>
<screenXY x="0.5" y="0.5" xunits="fraction" yunits="fraction"/> or placing an image at the top left of the screen:

<overlayXY x="0" y="1" xunits="fraction" yunits="fraction"/>
<screenXY x="0" y="1" xunits="fraction" yunits="fraction"/> or placing an image at the right of the screen:

<overlayXY x="1" y="1" xunits="fraction" yunits="fraction"/>
<screenXY x="1" y="1" xunits="fraction" yunits="fraction"/>.

The <size> tag is a simple tag and child of the <ScreenOverlay> element; it has no child tags. The <size> tag is used to indicate the width and height of the overlay image based on the screen size. Use of the size tag is best illustrated by example. To force the image to maintain its native height, width, and aspect ratio, set the values to zero: <size x="0" y="0" xunits="fraction" yunits="fraction"/>. To force the image to retain its horizontal dimension, but to take up 20% of the vertical screen space: <size x="0" y="0.2" xunits="fraction" yunits="fraction"/>. To force the image to resize to 100px by 500px: <size x="100" y="500" xunits="pixels" yunits="pixels"/>.

Dynamic Search Mechanism for Distributed Geospatial Information System

GISs often use a layered information metaphor. Such data layers correspond to individually selectable collections of predefined geospatial data, where the layers are large and not tied to the view area. For example, one layer might be "STATE NAMES" and a second layer might be "HIGHWAYS"; in the first case, the data could be text centered at the geographic midpoint of each state; in the second, the data could be lines representing surveyed centerlines of each major roadway. The data might be all the states or all the highways. A user in such a system could enable just the state names layer, the highway layer, both, or an analytic composition of the two. Having enabled these layers, as the view location moves through the database (such as from San Diego, Calif. to Portland, Me.), the corresponding highways and/or state names will be displayed. These general ideas are well understood in the GIS developer and user communities.

One embodiment of the present invention is a mechanism to extend the common layer of predefined data class having universal extent metaphor into the domain of arbitrary search queries by using view-based persistent search to emulate a preexisting search-specific data layer. In one such embodiment, a search request is stored, such as "find the location of ceramic supply stores selling Penrose tiles" in a mechanism referred to herein as a view-dependent network link (VDNL). In one such particular embodiment, a VDNL data structure includes any information needed to perform this query, such as one or more of names of remote search servers (such as "www.google.com" or "local.google.com"), importance of search, information related to quality of service, and historical search latencies and search results. This information contained in the VDNL data structure is generally referred to herein as a VDNL search specification.

Figure 8:
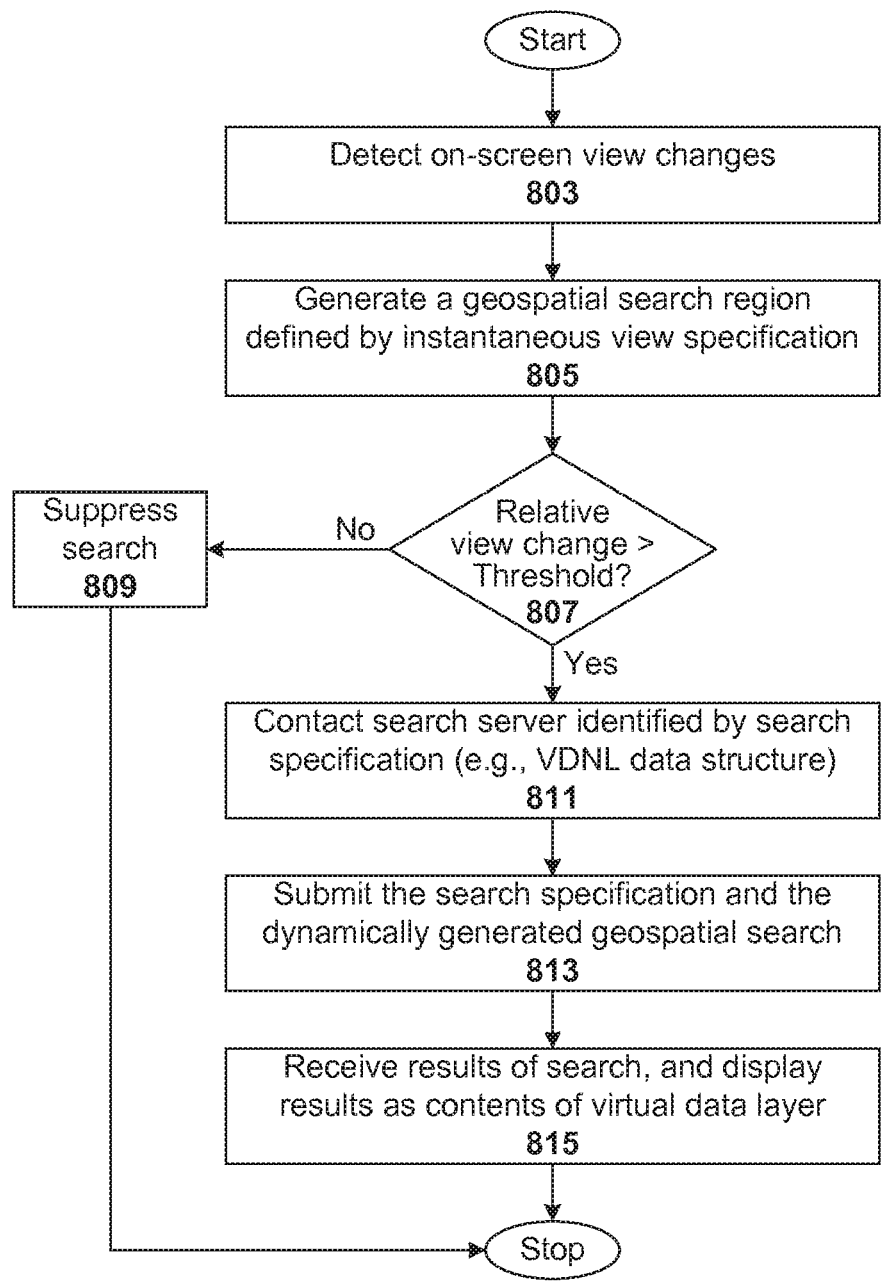
FIG. 8 illustrates a method for providing layered information in a GIS by using a mechanism referred to herein as a network link, in accordance with one embodiment of the present invention.

FIG. 8 illustrates a method for providing layered information in a GIS, in accordance with one embodiment of the present invention. The method can be carried out, for example, as a set of executable instructions running on a client 125 that is in communication with one or more servers. The functionality can be integrated into dedicated client-side modules, and/or into modules discussed with reference to FIG. 2a, as will be apparent in light of this disclosure.

The method includes detecting 803 on-screen view changes, and generating 805 a geospatial search region defined by the instantaneous view specification. The on-screen view changes can be caused, for example, by changing the view position, view orientation, or view specification. Such changes can be affected by the user manipulating interface controls of the GUI 201a, such as the pan control 311, tilt control 315, and rotation controls 327. In short, when such user input is received, the view specification changes. As previously explained, the renderer uses the view specification to determine whether drawable payload of a quad node resident in the quad node tree is not to be drawn. The renderer can also dynamically generate the geospatial search region defined by the instantaneous view specification (recall that the renderer reads the view specification on a periodic basis).

The method continues with determining 807 if the relative view change is greater than a predefined threshold. This determination dictates whether a VDNL search query is triggered (or not) by the motion of the view specification. In more detail, the search initiation consideration is based in part on the relative change between the resulting view and the former view (e.g., based on view parameters such as position, orientation, and pose). When the relative view change is not greater than the threshold or otherwise deemed slight (e.g., less than a 5% change to each monitored view parameter), then the method continues with suppressing 809 the VDNL search. Thus, no new layer of data will be provided (method terminates, and waits to detect a new change in view specification).

However, when the relative view change is greater than the threshold, then the method continues with contacting 811 a search server identified by the VDNL search specification (e.g., included in the VDNL data structure) to initiate a search request for layer data, and submitting 813 the VDNL search specification and the dynamically generated geospatial search region defined by the instantaneous view specification. The search server can be a local or remote search server that is specified in the search specification. The specified server then retrieves the data that is responsive to the request, based on the dynamically generated geospatial search region defined by the instantaneous view specification, and in accordance with parameters of the search specification. Thus, the view-dependency of the VDNL derives from the view-based search region.

The method continues with receiving 815 the results of search, and displaying those results as contents of virtual data layer. Thus, results of an implicitly-spawned VDNL search are returned to the mapping module 130, which then renders the virtual data layer as an overlay on the underlying map area or other target region. This view-based data layer is sufficient to provide the illusion of a universal data layer satisfying the stored search request if the VDNL search and response process described in steps 803 through 815 complete within a small portion of the per-frame image update interval of the mapping module 130, which in one case is $\frac{1}{60}^{th}$ of a second or less when advanced display devices and/or stereo viewing techniques are used. Other refresh display intervals and mapping module 130 update intervals will be apparent in light of this disclosure.

Depending on the system's per-frame display interval capability, some embodiments may be further configured to reduce search latency associated with steps 811 and/or 813 (e.g., in embodiments where a refresh interval every ¹/₆₀ of a second in not practical). In one particular case, search latency can be mitigated by requesting search results for a larger area than the current view region (on-screen) demands. This results in the return of an off-screen "border region" of search results that is not immediately useful or mandated by the view frustum, but will be usefully available for display of future frames as the view specification is moved into this search-result border zone, which is likely with continuous motion of the viewpoint. This embodiment of the method effectively creates a "search latency buffer" by enlarging the geospatial search area beyond the instantaneous view extent to include a border mandated by a specified border width profile (e.g., defined in VDNL data structure). This border width profile may be, for example, uniform around the view frustum, non-uniform to reflect a bias based on an anticipated direction of motion of the view specification, or otherwise resized from the instantaneous view. Anticipated direction of motion can be based, for instance, on historical user data, metrics, and/or other predictors of future motion. In addition, note that the off-screen border region can be provided only on one to three sides of the view frustum, and need not be completely around the view frustum.

In addition, or as an alternative, dynamic control of the border region width profile can be achieved based on historical observation of search latency and viewpoint motion. The goal here is to have a border area large enough that the on-screen view is unlikely to reach the outer limit of the border zone before a new search can be initiated and the results received and processed. The dynamic border width profile computed to provide sufficient "latency margin" may be the sole term in determining the border width profile used to resize the instantaneous view frustum. To avoid large swings in margin size when the view moves from a stopped state to a moving state, the computation of effective border width profile may use a weighted combination of former width profile and newly determined dynamic width profile, and may also impose one or more of: a lower limit based on desired quality of service, and an upper limit based on search server limits or bandwidth constraints or an overall adjustment based on relative importance of this particular VDNL compared to others that may be simultaneously active. Thus, and in accordance with one particular embodiment, the method may further include modulating and offsetting a static latency-hiding border width profile specified in the VDNL data structure based on dynamic circumstances. Such functionality effectively optimizes the search server's burden by scaling the latency-hiding technique to match the expected near-term demand, specifically by using a smaller buffer when the viewpoint is moving slowly and steadily.

The dynamic VDNL methodology described herein allows the presentation of geospatial search results resulting from a discontinuous sequence of spatially bounded ad-hoc geospatial searches in such a way that a user perceives a continuous data layer much like pre-computed data layers typical in conventional GISs. These VDNL-based virtual layers fill a user's virtual view with results based on an initial query to an initial view specification. The layers may appear universal in their content because results move on-screen smoothly with view specification changes having been pre-fetched within the extent of an adjusted geospatial extent (e.g., based on border region as previously described). As will be appreciated, the VDNL mechanism can be conservative in network traffic, search server requests, and local processing due to the dynamic adjustment of border width profile based on factors such as rates of view change and measured server latency.

Thus, the network link is a mechanism that can be used to iteratively fetch remote content for a GIS application, such as mapping module 130. The time-based network link fetches placemark files (e.g., KML/KMZ, as previously discussed) when triggered to do so by the passage of time ("Get file X every 20 seconds"). The view-dependent network link makes a search query when triggered by the motion of the view specification.

Numerous variations and implementations of the VDNL mechanism will be apparent in light of this disclosure. For instance, a network link that is the receiving endpoint, for example, of an RSS or an atom feed can be implemented. Such a network link could be used in an application, such as: "Listen to the news feed from CNN.com and whenever something new arrives, geolocate the story and display a new icon on the globe." Optionally, the view can be moved to see the new geolocated item, thereby giving the user additional perspective on the news story.

The VDNL data structure itself can vary, depending on the particular application. In general, it is a collection of information sufficient to represent the VDNL stored search activity. Example internal elements include: what was sent last time (the list of search results); when the last search was submitted (wall-clock time); and an integer describing the size of the following arrays: recent search positions[ ] (e.g., an array of real-valued 4-tuples giving a lat/lon bounding box for recent search requests); recent search border width profiles[ ] (e.g., an array of real numbers indicating size of instantaneous view-frustum expansion adjustment); and recent search latencies[ ] (e.g., an array of real numbers indicating time to complete corresponding search request). Note that the VDNL data structure could also be represented internally as an array of structures (classes) with methods corresponding to these values.

Ambiguous Search Requests

Another embodiment of the present invention enables ambiguous search requests in an interactive GIS. As previously stated, information search capabilities present in conventional GISs require a user to disambiguate the nature of a search request, selecting search scopes like "address search" or "lot number search" as either an explicit component of the search process or implicitly by allowing only a single scope (most often "address") within which all search requests are interpreted.

In contrast, one particular embodiment of the present invention enables a single text entry field into which an arbitrary search string may be entered (e.g., such as text input field 303 of FIG. 3a). This search string is inspected locally in the mapping module 130 (e.g., user interaction module 201), by one or more associated remote servers (e.g., of server system 105), or by a combination of local and remote processing to estimate the scope within which the search request is intended. Examples of this approach include disambiguating address specifications, telephone numbers, credit card numbers, place names, roadway intersections, personal names, shipping-service tracking numbers, and similar scopes.

The interactive GIS according to an embodiment of the present invention carries out this disambiguating automatically by inspecting the search specification, examining the characters and digits that comprise it, using this result to rank potential candidate search scopes, and then performing a search within the one or more likely scopes. In this way the user of a GIS is allowed to perform general searches across a large range of search scopes with greater ease and utility than has formerly been known in the art of geospatial information system design. Within the context of a GIS, the search request, once disambiguated by the examination process described herein, is then used as a search key within the estimated scope. The results of this search are then returned to the user in visual form as geospatial markers, lines, areas, text, and/or other annotations in the geospatial environment, in tabular or textual form, or in a combination of these presentation mechanisms.

An example of this mechanism would be entering the value "1ZA722W80328050424" into the GIS search mechanism of a client 125 configured in accordance with the principles of the present invention. By inspection based on rules of proper composition, this value can be confidently estimated to be a valid form of tracking identifier used uniquely by a shipping service (e.g., United Parcel Service) to specify a particular item being shipped. With the scope having been estimated as "UPS Parcel Identifier", the search can be interpreted as "find the UPS parcel #1ZA722W80328050424". The results of this search could be a parcel status (e.g., pending, in transit, received), and when in transit, a location such as the last known position of the item. A geospatial place identifier (such as latitude and longitude or street address) could be returned by the search to the mapping module 130, and this location specification could cause the renderer module 207 to draw a marker, such as the UPS Corporation's brown shield logo, at the indicated geospatial position. In this way a user could simply copy their (ambiguous) shipping information into a GIS search mechanism of a client 125 and receive a visual indication in return to identify the item's presently known location.

Further, clicking-on or otherwise selecting this brown shield logo could cause the display of detailed information about the item, such as time in transit, estimated time of delivery, name and signature of signer for delivered items, and similar information. Other such examples will be apparent in light of this disclosure (e.g., location/tracking of commercial airplanes and other commercial carriers; location/tracking of sports teams, entertainers, and other traveling entities). In any case, an interactive GIS configured in accordance with an embodiment of the present invention enables automated disambiguation of diverse search specifications.

Rules of proper composition recognize established patterns, and include the following examples: U.S. zip codes are numeric in the form 55555 or 55555-4444, which is likely to be a zip code; U.S. phone numbers are numeric in the form 333-4444, (333) 333-4444, 333-333-4444, 1-333-4444, 1-333-333-4444, +1 (333) 333-4444, etc.; AMEX card numbers have 'n' digits with a leading value of xxx; California driver's license numbers start with CA and have 'n' digits (other states have similar patterns that can be recognized); UPS intra-continental-US parcel tracking codes have 'n' characters, start with a known series, etc; and Greek postal addresses have a known and recognizable format.

Thus, one such embodiment employs rules of proper composition, each with a probability of being correct when matched. The rules of proper composition are applied against the ambiguous search, and the list of probabilities corresponding to the rules that are matched are evaluated. For instance, if one match, then search in that context. If one strong match, with others having much lower probability, then search in the strong-match context. If multiple matches of high probability, generate/display a "Did you mean . . . " dialog box and let the user disambiguate or otherwise clarify interactively; then remember the user's choice. If multiple matches, none of high probability, then generate/display a "Not understood" dialog box asking for more information, or perform a general search (such as Google web search or Google local search or other search engine) using the ambiguous search string.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for automatically updating digital maps, the method comprising:

receiving, by one or more processors in a client device via a communication network from a geographic information systems (GIS) server system, geographic information for generating interactive digital maps;

generating, by the one or more processors in the client device, a digital map of a geographic area using the received geographic information;

receiving, by the one or more processors in the client device via the communication network from the GIS server system, a geospatial description file that includes a designated location and a viewpoint of a virtual camera for viewing the designated location, wherein the viewpoint is unrelated to geometry specified by the designated location, such that the designated location is not within view; and presenting, by the one or more processors in the client device, an indication of the designated location on the digital map, the digital map presented from the viewpoint of the virtual camera.

2. The method of claim 1, further comprising:

presenting, by the one or more processors in the client device, the digital map of the geographic area from an initial viewpoint of the virtual camera;

presenting, by the one or more processors in the client device, a user control for viewing the designated location; and in response to receiving a selection of the user control, presenting, by the one or more processors in the client device, an indication of the designated location on the digital map and adjusting a view of the digital map from the initial viewpoint of the virtual camera to the viewpoint from the geospatial description file.

3. The method of claim 1, wherein the viewpoint of the virtual camera for viewing the designated location includes one or more of: a location of the viewpoint, a heading for the viewpoint indicative of a direction the virtual camera is facing, a tilt angle for the viewpoint, or a range indicative of the distance from a surface to the viewpoint of the virtual camera.

4. The method of claim 1, wherein the geospatial description file is consistent with a Keyhole Markup Language (KML) or compressed KML (KMZ) specification.

5. The method of claim 1, wherein receiving the geospatial description file includes iteratively fetching content from a third-party content server using a view-dependent network link (VDNL).

6. The method of claim 5, wherein using the view-dependent network link (VDNL) includes submitting, by the one or more processors, a VDNL data structure that specifies the third-party content server.

7. The method of claim 1, wherein generating the digital map includes generating a 3D satellite image map.

8. A client device comprising:

one or more processors; and a non-transitory computer-readable medium storing thereon instructions that, when executed by the one or more processors, cause the client device to:

receive, via a communication network from a geographic information systems (GIS) server system, geographic information for generating interactive digital maps;

generate a digital map of a geographic area using the received geographic information;

receive, via the communication network from the GIS server system, a geospatial description file that includes a designated location and a viewpoint of a virtual camera for viewing the designated location, wherein the viewpoint is unrelated to geometry specified by the designated location, such that the designated location is not within view; and present an indication of the designated location on the digital map, the digital map presented from the viewpoint of the virtual camera.

9. The client device of claim 8, wherein the instructions further cause the client device to:

present the digital map of the geographic area from an initial viewpoint of the virtual camera;

present a user control for viewing the designated location; and in response to receiving a selection of the user control, present an indication of the designated location on the digital map and adjusting a view of the digital map from the initial viewpoint of the virtual camera to the viewpoint from the geospatial description file.

10. The client device of claim 8, wherein the viewpoint of the virtual camera for viewing the designated location includes one or more of: a location of the viewpoint, a heading for the viewpoint indicative of a direction the virtual camera is facing, a tilt angle for the viewpoint, or a range indicative of the distance from a surface to the viewpoint of the virtual camera.

11. The client device of claim 8, wherein the geospatial description file is consistent with a Keyhole Markup Language (KML) or compressed KML (KMZ) specification.

12. The client device of claim 8, wherein to receive the geospatial description file, the instructions cause the client device to iteratively fetch content from a third-party content server using a view-dependent network link (VDNL).

13. The client device of claim 12, wherein to use the view-dependent network link (VDNL), the instructions cause the client device to submit a VDNL data structure that specifies the third-party content server.

14. The method of claim 8, wherein generating the digital map includes generating a 3D satellite image map.

15. A non-transitory computer-readable medium storing thereon instructions that, when executed by one or more processors, cause the one or more processors to:

receive, via a communication network from a geographic information systems (GIS) server system, geographic information for generating interactive digital maps;

generate a digital map of a geographic area using the received geographic information;

receive, via the communication network from the GIS server system, a geospatial description file that includes a designated location and a viewpoint of a virtual camera for viewing the designated location, wherein the viewpoint is unrelated to geometry specified by the designated location, such that the designated location is not within view; and present an indication of the designated location on the digital map, the digital map presented from the viewpoint of the virtual camera.

16. The non-transitory computer-readable medium of claim 15, wherein the instructions further cause the one or more processors to:

present the digital map of the geographic area from an initial viewpoint of the virtual camera;

present a user control for viewing the designated location; and in response to receiving a selection of the user control, present an indication of the designated location on the digital map and adjusting a view of the digital map from the initial viewpoint of the virtual camera to the viewpoint from the geospatial description file.

17. The non-transitory computer-readable medium of claim 15, wherein the viewpoint of the virtual camera for viewing the designated location includes one or more of: a location of the viewpoint, a heading for the viewpoint indicative of a direction the virtual camera is facing, a tilt angle for the viewpoint, or a range indicative of the distance from a surface to the viewpoint of the virtual camera.

* * * * *